(12) United States Patent
Shimmyo et al.

(10) Patent No.: US 11,280,203 B2
(45) Date of Patent: Mar. 22, 2022

(54) GAS TURBINE INCLUDING FIRST-STAGE STATOR VANES

(71) Applicant: Mitsubishi Hitachi Power Systems, Ltd., Yokohama (JP)

(72) Inventors: Tetsuya Shimmyo, Yokohama (JP); Shunsuke Torii, Yokohama (JP); Koichiro Iida, Tokyo (JP); Hitoshi Kitagawa, Tokyo (JP); Kenji Sato, Yokohama (JP); Kentaro Tokuyama, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 55 days.

(21) Appl. No.: 16/624,668

(22) PCT Filed: Jun. 19, 2018

(86) PCT No.: PCT/JP2018/023186
§ 371 (c)(1),
(2) Date: Dec. 19, 2019

(87) PCT Pub. No.: WO2019/026444
PCT Pub. Date: Feb. 7, 2019

(65) Prior Publication Data
US 2020/0109638 A1  Apr. 9, 2020

(30) Foreign Application Priority Data
Aug. 3, 2017  (JP) .............................. JP2017-150636

(51) Int. Cl.
*F01D 9/02*  (2006.01)
*F23R 3/46*  (2006.01)
(Continued)

(52) U.S. Cl.
CPC ................ *F01D 9/023* (2013.01); *F23R 3/46* (2013.01); *F02C 3/14* (2013.01); *F23R 3/42* (2013.01)

(58) Field of Classification Search
CPC .......... F01D 9/023; F01D 9/041; F01D 5/141; F02C 3/14; F02C 7/18; F23R 3/42; F23R 3/46; F05D 2220/3212
See application file for complete search history.

(56) References Cited

U.S. PATENT DOCUMENTS 2,833,514 A * 5/1958 Kahn ...................... F01D 9/042
  415/115
9,091,170 B2 * 7/2015 Sakamoto ............... F01D 5/186
(Continued)

FOREIGN PATENT DOCUMENTS

JP   2001-289003   10/2001
JP   2009-197650    9/2009
(Continued)

OTHER PUBLICATIONS

International Search Report dated Aug. 28, 2018 in International (PCT) Application No. PCT/JP2018/023186 with English-language translation.

(Continued)

*Primary Examiner* — William H Rodriguez
(74) *Attorney, Agent, or Firm* — Wenderoth, Lind & Ponack, L.L.P.

(57) ABSTRACT

A gas turbine includes a plurality of first-stage stator vanes arranged in a circumferential direction, the first-stage stator vanes each including a vane surface having a pressure surface and a suction surface, a first combustor disposed on a suction surface side of one of the first-stage stator vanes, the first combustor having a first combustor outlet which includes a first side wall portion extending along a radial direction, and a second combustor disposed on a pressure (Continued)

surface side of the one of the first-stage stator vanes and adjacent to the first combustor in the circumferential direction. The one of the first-stage stator vanes satisfies $0.05 \leq \Delta y/P \leq 0.25$, where $\Delta y$ is a protruding amount of the suction surface from the inner wall surface of the first side wall portion to the circumferential direction, and P is an arrangement pitch of the first-stage stator vanes in the circumferential direction.

15 Claims, 10 Drawing Sheets

(51) Int. Cl.
*F02C 3/14* (2006.01)
*F23R 3/42* (2006.01)

(56) References Cited

U.S. PATENT DOCUMENTS

| | | | | |
|---|---|---|---|---|
| 9,395,085 | B2* | 7/2016 | Budmir | F01D 9/023 |
| 2005/0079060 | A1* | 4/2005 | MacManus | F01D 5/145 |
| | | | | 416/235 |
| 2010/0313567 | A1* | 12/2010 | Nakamura | F01D 5/142 |
| | | | | 60/722 |
| 2012/0247125 | A1* | 10/2012 | Budmir | F01D 9/023 |
| | | | | 60/805 |
| 2014/0216055 | A1* | 8/2014 | Sakamoto | F23D 11/38 |
| | | | | 60/796 |
| 2018/0209282 | A1* | 7/2018 | Sakamoto | F23R 3/46 |
| 2021/0140329 | A1* | 5/2021 | Tokuyama | F01D 9/023 |

FOREIGN PATENT DOCUMENTS

| | | |
|---|---|---|
| JP | 2011-117700 | 6/2011 |
| JP | 5479058 | 4/2014 |

OTHER PUBLICATIONS

International Preliminary Report On Patentability dated Feb. 13, 2020 in International (PCT) Application No. PCT/JP2018/023186 with English-language translation.
Ioanna Aslanidou et al., "Leading Edge Shielding Concept in Gas Turbines With Can Combustors," Proceedings of ASME Turbo Expo 2012, GT2012-68644, Jun. 2012, pp. 1-11.

* cited by examiner

GAS TURBINE INCLUDING FIRST-STAGE STATOR VANES

TECHNICAL FIELD

The present disclosure relates to a gas turbine.

BACKGROUND

In order to improve efficiency of a gas turbine, various measures are adopted for the shape and arrangement of a first-stage stator vane disposed most upstream of a turbine.

For example, Patent Document 1 discloses a gas turbine in which a first-stage stator vane of a turbine is arranged close to a downstream end of a transition piece of a combustor downstream of a side wall of the transition piece. Since the first-stage stator vane is thus arranged close to the downstream end of the transition piece, an inflow of a combustion gas between the transition piece of the combustor and the first-stage stator vane of the turbine is suppressed, suppressing occurrence of a loss due to the inflow of the combustion gas. Moreover, since the first-stage stator vane is arranged downstream of the side wall of the transition piece of the combustor as described above, a direct collision of the high-temperature combustion gas against a leading edge of the first-stage stator vane is suppressed, reducing cooling air for cooling the leading edge of the first-stage stator vane.

Patent Document 1 also discloses a gas turbine formed into a shape in which an inner surface of the side wall of the transition piece of the combustor is smoothly connected to an outer surface of the first-stage stator vane adjacent to the side wall in a downstream end part of the side wall. Since the gas turbine is thus formed into the shape in which the inner surface of the side wall of the transition piece and the outer surface of the first-stage stator vane are smoothly connected, a flow of the combustion gas flowing through a combustion gas flow passage less becomes turbulent, suppressing occurrence of the loss.

Furthermore, Patent Document 2 discloses a gas turbine in which a ratio (S/P) of a circumferential distance S between a leading edge of a first-stage stator vane and the center between adjacent combustors to a circumferential pitch P of first-stage stator vanes, and a ratio (L/P) of an axial distance L between the leading edge of the first-stage stator vane and a rear end of a transition piece of the combustor to the circumferential pitch P of the first-stage stator vanes are set within a predetermined range in order to suppress an inner pressure fluctuation of the combustor and to improve aerodynamic efficiency of the gas turbine.

CITATION LIST

Patent Literature

Patent Document 1: JP2011-117700A
Patent Document 2: JP2009-197650A

SUMMARY

Technical Problem

Meanwhile, as a result of intensive researches by the present inventors, for example, as described in Patent Document 1, it was found that if an axial gap between the first-stage stator vane of the turbine and the side wall of the combustor is reduced by bringing a front part of the first-stage stator vane close to an outlet of the combustor, a flow of the high-temperature combustion gas via the axial gap may occur due to a pressure difference between a pressure-surface side (concave side) and a suction-surface side (convex side) of the first-stage stator vane. If the flow of a high-temperature gas via the axial gap described above occurs, the first-stage stator vane is heated by the flow of the high-temperature gas. Thus, it is necessary to increase the supply amount of a cooling medium for cooling the first-stage stator vane, which may result in a decrease in efficiency of the gas turbine as a whole.

However, Patent Documents 1 and 2 do not describe countermeasures to the flow of the high-temperature combustion gas via the axial gap between the first-stage stator vane and the side wall of the combustor, which is generated when the axial gap is reduced.

In view of the above, an object of at least one embodiment of the present invention is to provide a gas turbine capable of efficiently cooling a first-stage stator vane.

Solution to Problem (1) A gas turbine according to at least one embodiment of the present invention includes a plurality of first-stage stator vanes arranged in a circumferential direction, the first-stage stator vanes each including a vane surface having a pressure surface and a suction surface, a first combustor disposed on a suction surface side of one of the first-stage stator vanes, the first combustor having a first combustor outlet which includes a first side wall portion extending along a radial direction, and a second combustor disposed on a pressure surface side of the one of the first-stage stator vanes and adjacent to the first combustor in the circumferential direction, the second combustor having a second combustor outlet which includes a second side wall portion extending along the radial direction. The gas turbine satisfies one of condition (a) or (b) given below. Provided that an axial direction from upstream toward downstream is defined as an x-axis, and the circumferential direction from an outer side toward an inner side of the first side wall portion is defined as a y-axis, a first angle formed by a first tangent line to the suction surface with respect to a first reference tangent line is not greater than 45 degrees, the first tangent line passing through an intersection point between the suction surface in a front part of the one of the first-stage stator vanes and the first reference tangent line, the first reference tangent line passing through a position at which a slope dy/dx of an inner wall surface in a downstream end part of the first side wall portion is maximum and extending downstream of the inner wall surface. The one of the first-stage stator vanes satisfies $0.05 \leq \Delta y/P \leq 0.25$, where $\Delta y$ is a protruding amount of the suction surface from the inner wall surface of the first side wall portion to the circumferential direction, and P is an arrangement pitch of the first-stage stator vanes in the circumferential direction. The condition (a) is such that each of a minimum gap in the axial direction between the first side wall portion and the front part of the one of the first-stage stator vanes, and a minimum gap in the axial direction between the second side wall portion and the front part of the one of the first-stage stator vanes is not greater than 10% of a length La of the one of the first-stage stator vanes in the axial direction. The condition (b) is such that a most upstream point in the front part of the one of the first-stage stator vanes is positioned upstream of a most downstream end of at least one of the first side wall portion or the second side wall portion in the axial direction.

In the above configuration (1), since the gas turbine satisfies the above (a) or (b), a minimum distance between the front part of the one of the first-stage stator vanes and the first side wall portion or the second side wall portion of the corresponding combustor outlet is sufficiently small. Thus, the flow of a high-temperature combustion gas flowing between the front part of the one first-stage stator vane and the first side wall portion or the second side wall portion is reduced, making it possible to reduce the flow rate of a cooling medium needed to cool the first-stage stator vanes. In addition, in the above configuration (1), since the first angle formed by the above-described first tangent line to the suction surface in the front part of the one first-stage stator vane with respect to the above-described first reference tangent line to the inner wall surface of the first side wall portion is not greater than 45 degrees, the first side wall portion of the corresponding combustor outlet and the suction surface of the one first-stage stator vane are smoothly connected. Thus, it is possible to reduce turbulence in the flow of the high-temperature combustion gas from the combustor outlet.

The present inventors find that a pressure difference between the pressure surface side and the suction surface side of the one of the first-stage stator vanes changes in accordance with a ratio ($\Delta y/P$) of the protruding amount $\Delta y$ of the suction surface of the one first-stage stator vane from the inner wall surface of the first side wall portion to the circumferential direction to the arrangement pitch P of the first-stage stator vanes in the circumferential direction, and the pressure difference can be reduced by setting $\Delta y/P$ to an appropriate value.

In this regard, in the above configuration (1), furthermore, since the protruding amount $\Delta y$ of the suction surface of the one first-stage stator vane from the inner wall surface of the first side wall portion to the circumferential direction and the arrangement pitch P of the first-stage stator vanes in the circumferential direction satisfy $0.05 \leq \Delta y/P \leq 0.25$, the pressure difference between the pressure surface side and the suction surface side of the one first-stage stator vane is relatively small. Thus, occurrence of the flows of the high-temperature gases via gaps between the front part of the one first-stage stator vane, and the first combustor outlet and the second combustor outlet due to the pressure difference between the pressure surface side and the suction surface side of the one first-stage stator vane is suppressed, making it possible to reduce the flow rate of the cooling medium needed to cool the first-stage stator vanes.

In view of the above, with the above configuration (1), it is possible to efficiently cool the first-stage stator vanes while reducing turbulence in the flows of the high-temperature combustion gases from the combustor outlets. Thus, it is possible to suppress an efficiency decrease of the gas turbine.

(2) In some embodiments, in the above configuration (1), provided that the circumferential direction from an outer side toward an inner side of the second side wall portion is defined as a y'-axis, a second angle formed by a second tangent line to the pressure surface with respect to a second reference tangent line is not greater than 45 degrees, the second tangent line passing through an intersection point between the pressure surface in the front part of the one of the first-stage stator vanes and the second reference tangent line, the second reference tangent line passing through a position at which a slope $dy'/dx$ of an inner wall surface in a downstream end part of the second side wall portion is maximum and extending downstream of the inner wall surface.

With the above configuration (2), since the second angle formed by the above-described second tangent line to the pressure surface in the front part of the one of the first-stage stator vanes with respect to the above-described second reference tangent line to the inner wall surface of the second side wall portion is not greater than 45 degrees, the second side wall portion of the corresponding combustor outlet and the pressure surface of the one first-stage stator vane are smoothly connected. Thus, it is possible to effectively reduce turbulence in the flow of the high-temperature combustion gas from the combustor outlet.

(3) In some embodiments, in the above configuration (2), the first angle is not less than 20 degrees and not greater than 45 degrees, and the second angle is not less than 0 degrees and not greater than 25 degrees.

With the above configuration (3), since the first angle on the suction surface side is set within the above-described range, a static pressure increases on the suction surface side due to a collision of a combustion-gas flow against the suction surface of the one of the first-stage stator vanes. On the other hand, since the second angle on the pressure surface side is set within the above-described range, the pressure surface recedes downstream of the combustion-gas flow as compared with a case in which the second angle is greater than 25 degrees, making it possible to decrease the pressure on the pressure surface side in the vicinity of the gap described above. Thus, it is possible to suppress occurrence of the flows of the high-temperature gases via the gaps between the front part of the one first-stage stator vane, and the first combustor outlet and the second combustor outlet.

(4) In some embodiments, in the above configuration (2) or (3), the first angle is not less than the second angle.

With the above configuration (4), since the first angle is not less than the second angle, it is possible to increase the pressure on the suction surface side while decreasing the pressure on the pressure surface side, and to effectively suppress occurrence of the flows of the high-temperature gases via the gaps between the front part of the one of the first-stage stator vanes, and the first combustor outlet and the second combustor outlet.

(5) In some embodiments, in any one of the above configurations (1) to (4), the first side wall portion and the second side wall portion respectively have downstream end surfaces each including a flat surface along an orthogonal plane in the axial direction, the front part has a front end surface facing the downstream end surface of the first side wall portion and the downstream end surface of the second side wall portion, and at least a part of the front end surface is a flat surface disposed along the orthogonal plane in the axial direction.

With the above configuration (5), the downstream end surfaces of the first side wall portion and the second side wall portion, and at least the part of the front end surface in the front part of the one of the first-stage stator vanes facing the downstream end surfaces are each formed by the flat surface along the orthogonal plane in the axial direction. Thus, management of the gaps in the axial direction between the front part of the one first-stage stator vane, and the first combustor outlet and the second combustor outlet is easier than in a case in which the downstream end surfaces of the first side wall portion and the second side wall portion or the front end surface in the front part of the one first-stage stator vane is formed by a curved surface. Therefore, the flow rate of the cooling medium needed to cool the first-stage stator vanes is reduced easily.

(6) In some embodiments, in any one of the above configurations (1) to (5), the one of the first-stage stator vanes includes a rear part positioned downstream of the front part, and having a convex curved surface and a concave curved surface, the convex curved surface being a trailing edge region of the suction surface, the concave curved surface being a trailing edge region of the pressure surface, and a leading edge end of the convex curved surface of the suction surface is closer to the second side wall portion in the circumferential direction than a portion of the suction surface protruding the most from the inner wall surface of the first side wall portion to the circumferential direction.

With the above configuration (6), the combustion-gas flow from the first combustor outlet is likely to collide against the suction surface of the one of the first-stage stator vanes, and thus the static pressure is likely to increase on the suction surface side. Thus, the pressure difference between the suction surface side and the pressure surface side is reduced, making it possible to effectively suppress occurrence of the flows of the high-temperature gases via the gaps between the front part of the one first-stage stator vane, and the first combustor outlet and the second combustor outlet.

(7) In some embodiments, in any one of the above configurations (1) to (6), the one of the first-stage stator vanes includes a rear part positioned downstream of the front part, and having a convex curved surface and a concave curved surface, the convex curved surface being a trailing edge region of the suction surface, the concave curved surface being a trailing edge region of the pressure surface, and the front part includes a first surface linearly extending from a leading edge end of the convex curved surface toward the first side wall portion so as to form a leading edge region of the suction surface, and a second surface linearly extending from a leading edge end of the concave curved surface toward the second side wall portion so as to form a leading edge region of the pressure surface.

With the above configuration (7), since the leading edge region of the suction surface is formed by the first surface extending linearly, and the leading edge region of the pressure surface is formed by the second surface extending linearly, the first-stage stator vanes are manufactured relatively easily.

(8) In some embodiments, in the above configuration (7), the first side wall portion and the second side wall portion respectively have downstream end surfaces each including a flat surface along an orthogonal plane in the axial direction, and the front part includes a first flat surface which has a first connection point connected to a leading edge end of the first surface and extends along the orthogonal plane in the axial direction so as to face the downstream end surface of the first side wall portion, and a second flat surface which has a second connection point connected to a leading edge end of the second surface and extends along the orthogonal plane in the axial direction so as to face the downstream end surface of the second side wall portion.

With the above configuration (8), the downstream end surfaces of the first side wall portion and the second side wall portion are each formed by the flat surface, and the first flat surface and the second flat surface in the front part respectively face the downstream end surface of the first side wall portion and the downstream end surface of the second side wall portion each including the flat surface. Thus, management of the gaps in the axial direction between the front part of the one of the first-stage stator vanes, and the first combustor outlet and the second combustor outlet is easier than in the case in which the downstream end surfaces of the first side wall portion and the second side wall portion or the front end surface in the front part of the one first-stage stator vane is formed by the curved surface. Therefore, the flow rate of the cooling medium needed to cool the first-stage stator vanes is reduced easily.

(9) In some embodiments, in the above configuration (8), a distance in the circumferential direction between the first connection point and the second connection point is smaller than a distance in the circumferential direction between the inner wall surface of the first side wall portion and the inner wall surface of the second side wall portion.

With the above configuration (9), since the distance in the circumferential direction between the first connection point and the second connection point is smaller than the distance in the circumferential direction between the inner wall surface of the first side wall portion and the inner wall surface of the second side wall portion, the flows of the combustion gases from the combustor outlets less become turbulent as compared with a case in which the above-described distance between the first connection point and the second connection point is larger than the above-described distance between the inner wall surface of the first side wall portion and the inner wall surface of the second side wall portion. Thus, occurrence of a fluid loss in the turbine is suppressed easily.

(10) In some embodiments, in the above configuration (8) or (9), the first connection point of the first flat surface is positioned between the second side wall portion and the inner wall surface of the first side wall portion in the circumferential direction.

With the above configuration (10), since the first connection point of the first flat surface is positioned between the second side wall portion and the inner wall surface of the first side wall portion in the circumferential direction, the flow of the combustion gas from the first combustor outlet A less becomes turbulent on the suction surface side. Thus, occurrence of the fluid loss in the turbine is suppressed easily.

(11) In some embodiments, in any one of the above configurations (8) to (10), the second connection point of the second flat surface is positioned between the first side wall portion and the inner wall surface of the second side wall portion in the circumferential direction.

With the above configuration (11), since the second connection point of the second flat surface is positioned between the first side wall portion and the inner wall surface of the second side wall portion in the circumferential direction, the flow of the combustion gas from the second combustor outlet less becomes turbulent on the pressure surface side. Thus, occurrence of the fluid loss in the turbine is suppressed easily.

(12) In some embodiments, in any one of the above configurations (1) to (11), an angle formed by the first tangent line in the front part of the one of the first-stage stator vanes with respect to the axial direction is not less than 15 degrees and not greater than 45 degrees.

With the above configuration (12), since the angle formed by the first tangent line to the suction surface with respect to the axial direction is set within the above-described range, the static pressure is likely to increase on the suction surface side due to the collision of the combustion-gas flow against the suction surface of the one of the first-stage stator vanes. Thus, it is possible to effectively suppress occurrence of the flows of the high-temperature gases via the gaps between the front part of the one first-stage stator vane, and the first combustor outlet and the second combustor outlet.

(13) In some embodiments, in any one of the above configurations (1) to (12), an angle formed by the second tangent line in the front part of the one of the first-stage stator vanes with respect to the axial direction is not less than 0 degrees and not greater than 30 degrees.

With the above configuration (13), since the angle formed by the second tangent line to the pressure surface with respect to the axial direction is set within the above-described range, the pressure surface recedes downstream of the combustion-gas flow as compared with a case in which the angle is greater than 30 degrees, the pressure on the pressure surface side in the vicinity of the gaps between the front part of the one of the first-stage stator vanes, and the first combustor outlet and the second combustor outlet is decreased easily. Thus, it is possible to effectively suppress occurrence of the flows of the high-temperature gases via the above-described gaps with the front part of the one first-stage stator vane.

(14) In some embodiments, in any one of the above configurations (1) to (13), a minimum gap $g_1$ in the axial direction between the front part and the first side wall portion, and a minimum gap $g_2$ in the axial direction between the front part and the second side wall portion satisfy $0.9 \leq g_1/g_2 \leq 1.1$.

With the above configuration (14), that is, since the size of the minimum gap $g_1$ on the suction surface side and the size of the minimum gap $g_2$ on the pressure surface side of the one of the first-stage stator vanes are almost equal, it is possible to reduce a difference between amounts of the cooling medium distributed to the suction surface side and the pressure surface side respectively via the gaps between the front part of the one first-stage stator vane, and the downstream end surfaces of the first side wall portion and the second side wall portion. Thus, it is possible to reduce the flow rate of the cooling medium in the gas turbine as a whole.

(15) In some embodiments, in any one of the above configurations (1) to (14), the one of the first-stage stator vanes satisfies $0.1 \leq \Delta y/P \leq 0.2$.

With the above configuration (15), since the protruding amount $\Delta y$ of the suction surface of the one of the first-stage stator vanes from the inner wall surface of the first side wall portion to the circumferential direction and the arrangement pitch P of the first-stage stator vanes in the circumferential direction satisfy $0.1 \leq \Delta y/P \leq 0.2$, it is possible to further reduce the pressure difference between the pressure surface side and the suction surface side of the one first-stage stator vane. Thus, occurrence of the flows of the high-temperature gases via the gaps between the front part of the one of the first-stage stator vanes, and the first combustor outlet and the second combustor outlet due to the pressure difference between the pressure surface side and the suction surface side of the first-stage stator vane is suppressed, making it possible to more effectively reduce the flow rate of the cooling medium needed to cool the first-stage stator vanes.

(16) A gas turbine according to at least one embodiment of the present invention includes a plurality of first-stage stator vanes arranged in a circumferential direction, the first-stage stator vanes each including a vane surface having a pressure surface and a suction surface, a first combustor disposed on a suction surface side of one of the first-stage stator vanes, the first combustor having a first combustor outlet which includes a first side wall portion extending along a radial direction, and a second combustor disposed on a pressure surface side of the one of the first-stage stator vanes and adjacent to the first combustor in the circumferential direction, the second combustor having a second combustor outlet which includes a second side wall portion extending along the radial direction. The gas turbine satisfies one of condition (a) or (b) given below. Provided that an axial direction from upstream toward downstream is defined as an x-axis, the circumferential direction from an outer side toward an inner side of the first side wall portion is defined as a y-axis, $W_1$ is a thickness of a downstream end of the first side wall portion in the circumferential direction, a first region is a region between a first outer boundary line and a first inner boundary line, and La is a length of the one of the first-stage stator vanes in the axial direction, the first outer boundary line being obtained by displacing, to a negative direction of the y-axis by $0.5 \times W_1$, a first reference tangent line passing through a first reference position at which a slope dy/dx of an inner wall surface in a downstream end part of the first side wall portion is maximum and extending downstream of the inner wall surface, the first inner boundary line passing through the first reference position and forming a 45-degree angle with respect to the first reference tangent line, the suction surface in a front part of the one of the first-stage stator vanes is included in the first region within an axial range between a position at an upstream end of a part of the suction surface in the front part included in the first region and a position downstream by a length of 0.2La from the position. The one of the first-stage stator vanes satisfies $0.05 \leq \Delta y/P \leq 0.25$, where $\Delta y$ is a protruding amount of the suction surface from the inner wall surface of the first side wall portion to the circumferential direction, and P is an arrangement pitch of the first-stage stator vanes in the circumferential direction.

The condition (a) is such that each of a minimum gap in the axial direction between the first side wall portion and the front part of the one of the first-stage stator vanes, and a minimum gap in the axial direction between the second side wall portion and the front part of the one of the first-stage stator vanes is not greater than 10% of a length La of the one of the first-stage stator vanes in the axial direction. The condition (b) is such that a most upstream point in the front part of the one of the first-stage stator vanes is positioned upstream of a most downstream end of at least one of the first side wall portion or the second side wall portion in the axial direction.

The gas turbine having the above configuration (16) may have the feature according to any one of the above configurations (2) to (15).

In the above configuration (16), since the gas turbine satisfies the above (a) or (b), a minimum distance between the front part of the one of the first-stage stator vanes and the first side wall portion or the second side wall portion of the corresponding combustor outlet is sufficiently small. Thus, the flow of the high-temperature combustion gas flowing between the front part of the one first-stage stator vane and the first side wall portion or the second side wall portion is reduced, making it possible to reduce the flow rate of the cooling medium needed to cool the first-stage stator vanes. Moreover, in the above configuration (16), since the suction surface in the front part of the one first-stage stator vane is included in the above-described first region within the axial range between the position at the upstream end of the part of the suction surface in the front part of the one first-stage stator vane included in the above-described first region and the position downstream by the length of 0.2La from the position (La is the length of the one of the first-stage stator vanes in the axial direction), the first side wall portion of the corresponding combustor outlet and the suction surface of the one first-stage stator vane are smoothly connected. Thus, it is possible to reduce turbulence in the flow of the high-temperature combustion gas from the combustor outlet.

In addition, in the above configuration (16), furthermore, since the protruding amount $\Delta y$ of the suction surface of the one of the first-stage stator vanes from the inner wall surface of the first side wall portion to the circumferential direction and the arrangement pitch P of the first-stage stator vanes in the circumferential direction satisfy 0.05≤Δy/P≤0.25, the pressure difference between the pressure surface side and the suction surface side of the one first-stage stator vane is relatively small. Thus, occurrence of the flows of the high-temperature gases via gaps between the front part of the one first-stage stator vane, and the first combustor outlet and the second combustor outlet due to the pressure difference between the pressure surface side and the suction surface side of the one first-stage stator vane is suppressed, making it possible to reduce the flow rate of the cooling medium needed to cool the first-stage stator vanes.

In view of the above, with the above configuration (16), it is possible to efficiently cool the first-stage stator vanes while reducing turbulence in the flows of the high-temperature combustion gases from the combustor outlets. Thus, it is possible to suppress the efficiency decrease of the gas turbine.

(17) In some embodiments, in the above configuration (16), provided that the circumferential direction from an outer side toward an inner side of the second side wall portion is defined as a y-axis, $W_2$ is a thickness of a downstream end of the second side wall portion in the circumferential direction, and a second region is a region between a second outer boundary line and a second inner boundary line, the second outer boundary line being obtained by displacing, to a negative direction of the y'-axis by $0.5 \times W_2$, a second reference tangent line passing through a second reference position at which a slope dy'/dx of an inner wall surface in a downstream end part of the second side wall portion is maximum and extending downstream of the inner wall surface, the second inner boundary line passing through the second reference position and forming a 45-degree angle with respect to the second reference tangent line, the pressure surface in the front part is included in the second region within an axial range between a position at an upstream end of a part of the pressure surface in the front part included in the second region and a position downstream by the length of 0.2La from the position.

In the above configuration (17), since the pressure surface in the front part of the one of the first-stage stator vanes is included in the above-described second region within the axial range between the position at the upstream end of the part of the pressure surface in the front part of the one first-stage stator vane included in the above-described second region and the position downstream by the length of 0.2La from the position (La is the length of the one of the first-stage stator vanes in the axial direction), the second side wall portion of the corresponding combustor outlet and the pressure surface of the one first-stage stator vane are smoothly connected. Thus, it is possible to reduce turbulence in the flow of the high-temperature combustion gas from the combustor outlet.

Advantageous Effects

According to at least one embodiment of the present invention, a gas turbine capable of efficiently cooling a first-stage stator vane is provided.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
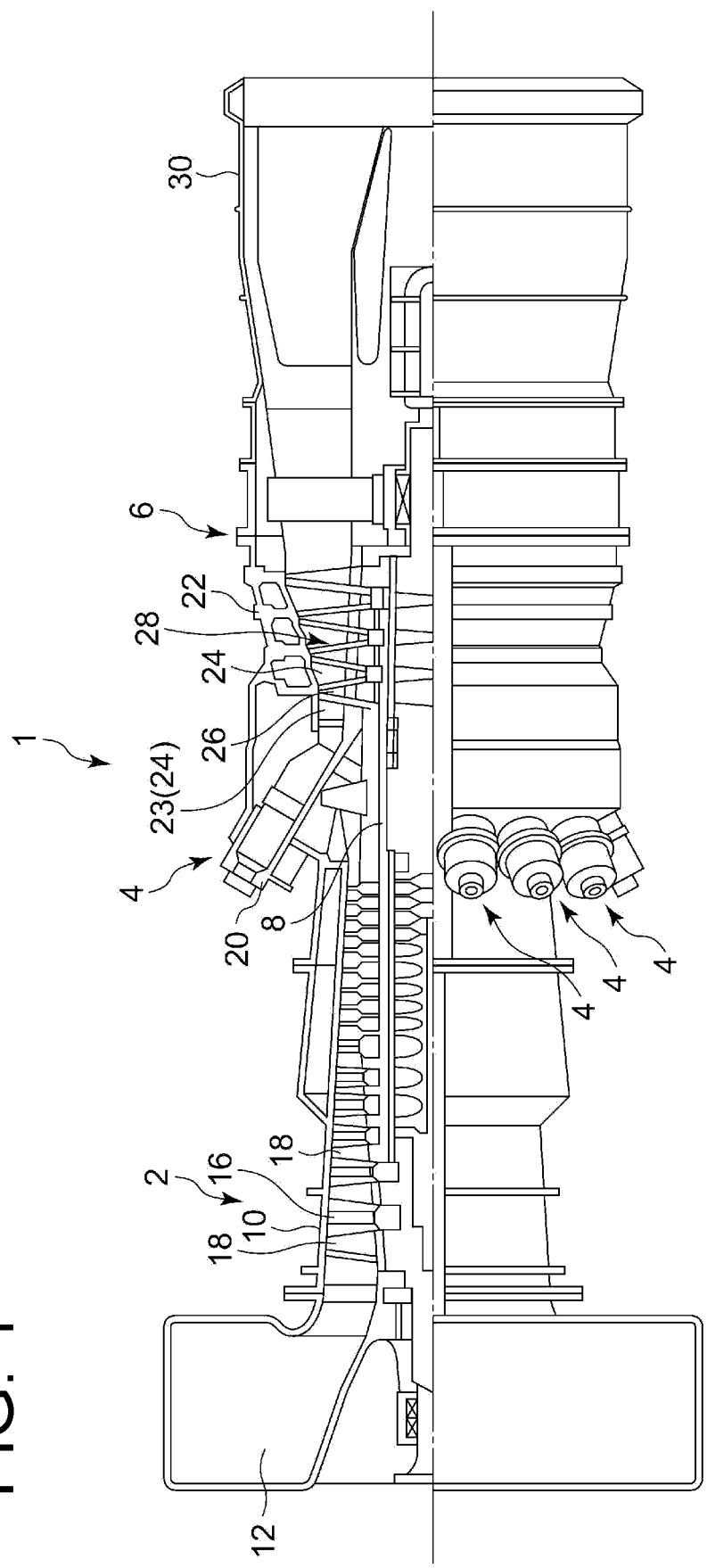
FIG. 1 is a schematic configuration view of a gas turbine according to an embodiment.

FIG. 1 is a schematic configuration view of a gas turbine according to an embodiment.

As shown in FIG. 1, a gas turbine 1 includes a compressor 2 for generating compressed air, combustors 4 for each generating a combustion gas from the compressed air and fuel, and a turbine 6 configured to be rotary driven by the combustion gas. In the case of the gas turbine 1 for power generation, a generator (not shown) is connected to the turbine 6.

The compressor 2 includes a plurality of stator vanes 16 fixed to the side of a compressor casing 10 and a plurality of rotor blades 18 implanted on the rotor 8 so as to be arranged alternately with respect to the stator vanes 16.

Intake air from an air inlet 12 is sent to the compressor 2, and passes through the plurality of stator vanes 16 and the plurality of rotor blades 18 to be compressed, turning into compressed air having a high temperature and a high pressure.

Each of the combustors 4 is supplied with fuel and the compressed air generated by the compressor 2, and combusts the fuel to generate the combustion gas which serves as a working fluid of the turbine 6. As shown in FIG. 1, the gas turbine 1 includes the plurality of combustors 4 which are circumferentially arranged in a casing 20 centering around the rotor 8.

The turbine 6 includes a combustion gas flow passage 28 formed by a turbine casing 22, and includes a plurality of stator vanes 24 and rotor blades 26 disposed in the combustion gas flow passage 28.

Each of the stator vanes 24 is fixed to the side of the turbine casing 22. The plurality of stator vanes 24 arranged along the circumferential direction of the rotor 8 form a stator vane row. Moreover, each of the rotor blades 26 is implanted on the rotor 8. The plurality of rotor blades 26 arranged along the circumferential direction of the rotor 8 form a rotor blade row.

The stator vane row and the rotor blade row are alternately arranged in the axial direction of the rotor 8. Of the plurality of stator vanes 24, the stator vane 24 disposed most upstream (that is, the stator vane 24 disposed at a position close to the combustors 4) is a first-stage stator vane 23.

In the turbine 6, the combustion gas flowing into the combustion gas flow passage 28 from the combustors 4 passes through the plurality of stator vanes 24 and the plurality of rotor blades 26, rotary driving the rotor 8. Consequently, the generator connected to the rotor 8 is driven to generate power. The combustion gas having driven the turbine 6 is discharged outside via an exhaust chamber 30.

Figure 2:
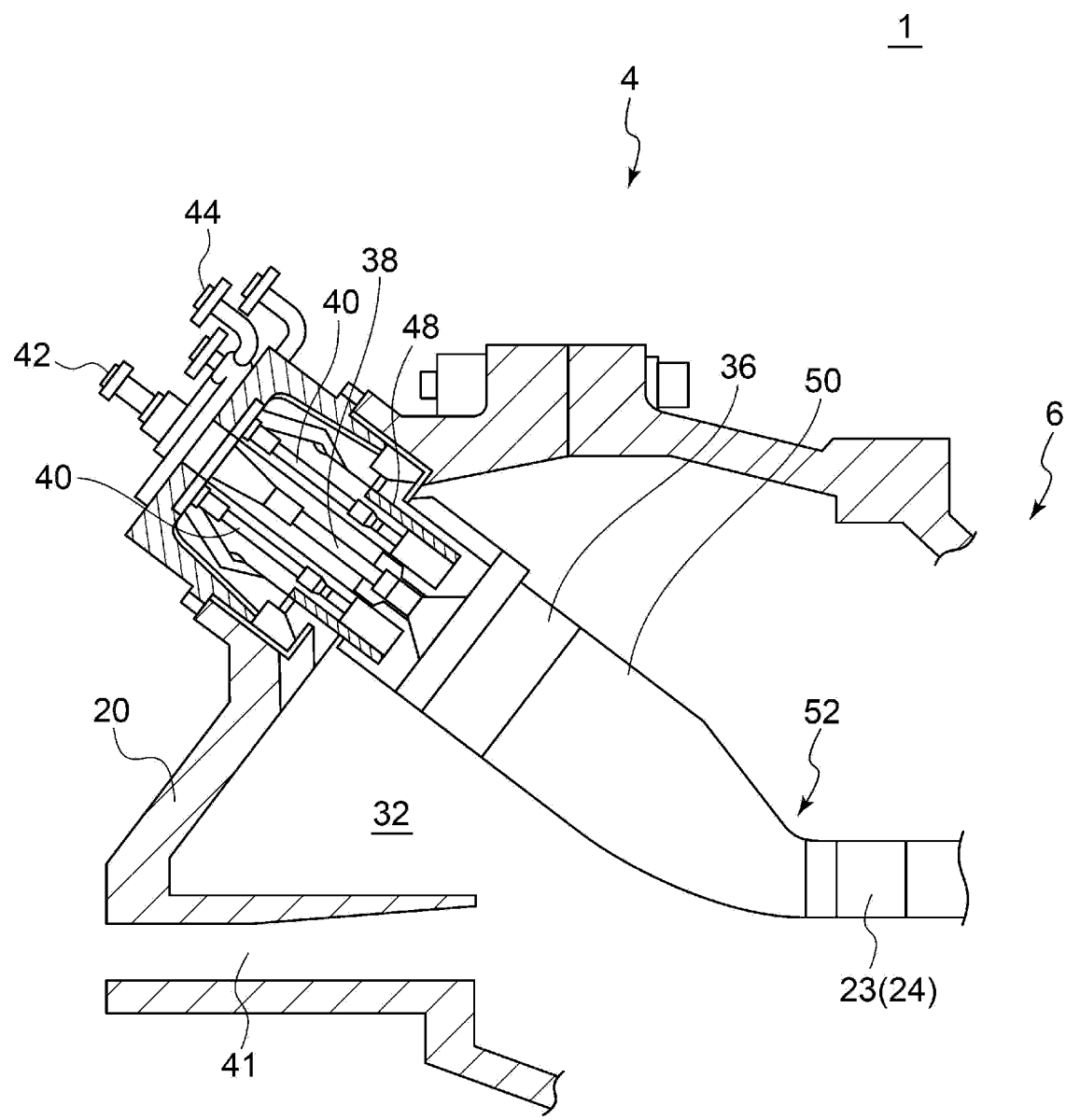
FIG. 2 is a schematic view of a combustor and an inlet portion of a turbine in the gas turbine according to an embodiment.

FIG. 2 is a schematic view of the combustor 4 and an inlet portion of the turbine 6 in the gas turbine 1 according to an embodiment.

As shown in FIG. 2, each of the plurality of combustors 4 which are annularly arranged centering around the rotor 8 (see FIG. 1) includes a combustor liner 36, and a first combustion burner 38 and a plurality of second combustion burners 40 respectively arranged in the combustor liner 36. The combustor liner 36 is disposed in a combustor casing 32 defined by the casing 20. The second combustion burners 40 are arranged so as to surround the first combustion burner 38. The combustors 4 may each include other constituent elements such as a bypass line (not shown) for bypassing the combustion gas.

The combustor liner 36 includes a combustor basket 48 arranged around the first combustion burner 38 and the plurality of second combustion burners 40, and a transition piece 50 connected to a tip part of the combustor basket 48. The combustor basket 48 and the transition piece 50 may form a combustion cylinder as a single piece.

The first combustion burner 38 and the second combustion burners 40 each include a fuel nozzle (not shown) for injecting a fuel and a burner cylinder (not shown) arranged so as to surround the fuel nozzle. Each fuel nozzle is supplied with the fuel via fuel ports 42 and 44. Moreover, the compressed air generated by the compressor 2 (see FIG. 1) is supplied into the combustor casing 32 via a casing inlet 41, and then flows into each burner cylinder from the combustor casing 32. Then, the fuel injected from the fuel nozzle and the compressed air are mixed in each burner cylinder, and the air-fuel mixture flows into the combustor liner 36 to be ignited and combusted, thereby generating a combustion gas.

The first combustion burner 38 may be a burner for producing a diffusion combustion flame, and the second combustion burners 40 may be burners for combusting a premixed air-fuel mixture to produce a premixed combustion flame.

That is, the fuel from the fuel port 44 and the compressed air is premixed in the second combustion burners 40, and the premixed air-fuel mixture mainly forms a swirl flow by a swirler (not shown) and flows into the combustor liner 36. Further, the compressed air and the fuel injected from the first combustion burner 38 via the fuel port 42 are mixed in the combustor liner 36, and ignited by a pilot light (not shown) to be combusted, whereby a combustion gas is generated. At this time, a part of the combustion gas diffuses to the surroundings with flames, which ignites the premixed air-fuel mixture flowing into the combustor liner 36 from each of the second combustion burners 40 to cause combustion. Specifically, the diffusion combustion flame due to the diffusion combustion fuel injected from the first combustion burner 38 can hold flames for performing stable combustion of premixed air-fuel mixture (premixed fuel) from the second combustion burners 40. At this time, a combustion region is formed in, for instance, the combustor basket 48 and may not be formed in the transition piece 50.

The combustion gas generated by combustion of the fuel in the combustor 4 as described above flows into the first-stage stator vane 23 of the turbine 6 via an outlet 52 of the combustor 4 positioned in a downstream end part of the transition piece 50.

Figure 3:
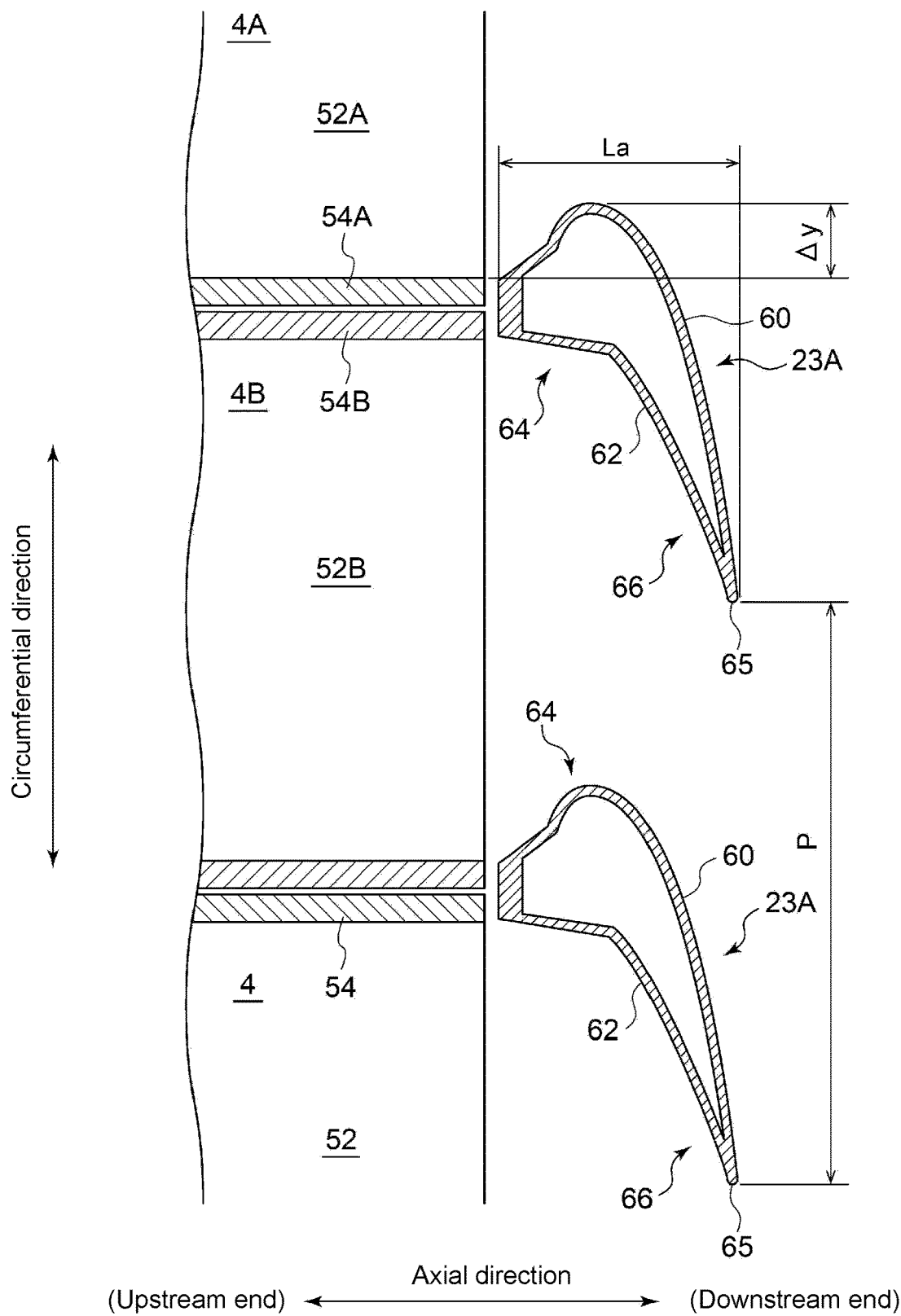
FIG. 3 is a view showing the configuration of combustor outlets and an inlet part of the turbine in the gas turbine according to an embodiment.
Figure 4:
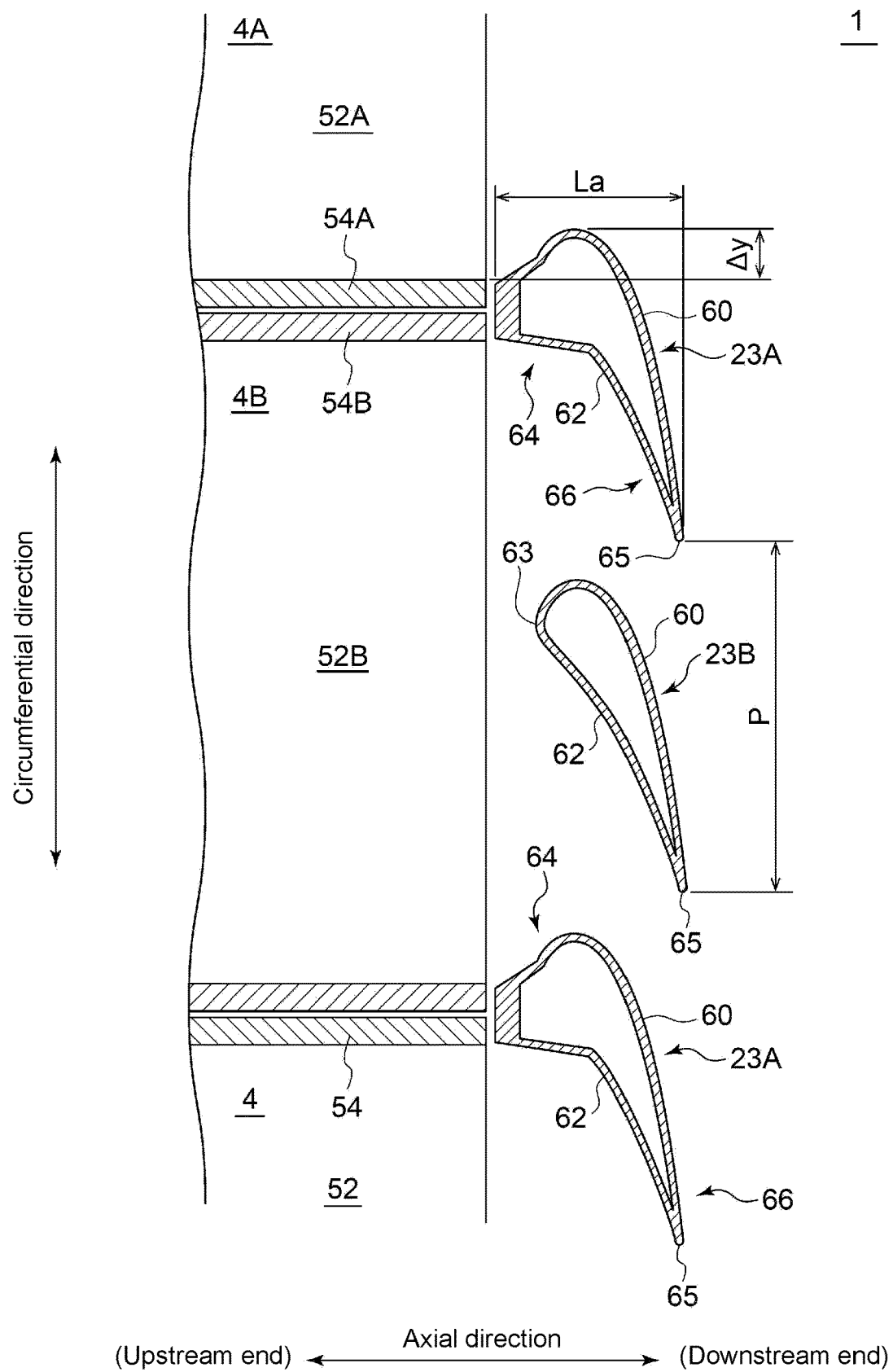
FIG. 4 is a view showing the configuration of the combustor outlets and the inlet part of the turbine in the gas turbine according to an embodiment.

FIGS. 3 and 4 are each a circumferential cross-sectional view showing the configuration of the outlets 52 of the combustors 4 and an inlet part of the turbine 6 in the gas turbine 1 according to an embodiment.

As shown in FIGS. 1, 3, and 4, the gas turbine 1 includes the plurality of combustors 4 arranged in the circumferential direction. Each of the outlets 52 of the plurality of combustors 4 includes a side wall portion 54 extending along the radial direction (the orthogonal direction of the drawing in each of FIGS. 3 and 4).

A description will be given below by referring one of the combustors 4 adjacent in the circumferential direction as a first combustor 4A and the other as a second combustor 4B. The first combustor 4A includes a first combustor outlet 52A with a first side wall portion 54A extending along the radial direction. The second combustor 4B includes a second combustor outlet 52B with a second side wall portion 54B extending along the radial direction.

As shown in FIGS. 3 and 4, a plurality of first-stage stator vanes 23 (23A, 23B) of the turbine 6 are respectively arranged in the circumferential direction at axial positions downstream of the first side wall portion 54A and the second side wall portion 54B. The plurality of first-stage stator vanes 23 include the first-stage stator vane 23A (one first-stage stator vane) disposed downstream of the first side wall portion 54A of the first combustor 4A and the second side wall portion 54B of the second combustor 4B along the axial direction.

In the exemplary embodiments shown in FIGS. 3 and 4, the first-stage stator vane 23A is disposed downstream of each of a pair of first side wall portion 54A and second side wall portion 54B facing each other in the circumferential direction. The plurality of first-stage stator vanes 23A are arranged in the circumferential direction.

In the exemplary embodiment shown in FIG. 4, the plurality of first-stage stator vanes 23 of the turbine 6 further include the first-stage stator vane 23B other than the above-described first-stage stator vane 23A (one first-stage stator vane). The first-stage stator vane 23B is disposed at a circumferential position between a pair of first-stage stator vanes 23A and 23A adjacent to each other in the circumferential direction. The first-stage stator vanes 23A and the first-stage stator vane 23B are alternately arranged in the circumferential direction.

Each of the first-stage stator vanes 23A, 23B includes a trailing edge 65, and a vane surface having a pressure surface 62 (concave surface) and a suction surface 60 (convex surface) each extending along the radial direction. At least a part of the pressure surface 62 is formed by a concave curved surface. At least a part of the suction surface 60 is formed by a convex curved surface. The curved surfaces may at least partially form an airfoil having the pressure surface 62, the suction surface 60, and the trailing edge 65.

As shown in FIG. 4, the pressure surface 62 and the suction surface 60 of the first-stage stator vane 23B may extend along the radial direction between a leading edge 63 and the trailing edge 65, and the airfoil may be formed by the pressure surface 62 and the suction surface 60.

As shown in FIGS. 3 and 4, the first combustor 4A is disposed on the suction surface side 60 of the first-stage stator vane 23A in the circumferential direction, and the second combustor 4B is disposed on the pressure surface side 62 of the first-stage stator vane 23A in the circumferential direction. Moreover, the first side wall portion 54A is disposed on the suction surface side 60 of the first-stage stator vane 23A in the circumferential direction, and the second side wall portion 54B facing the first side wall portion 54A is disposed on the pressure surface side 62 of the first-stage stator vane 23A in the circumferential direction.

FIGS. 5 to 9 are each a partially enlarged view of the gas turbine 1 shown in FIG. 3 or 4, and are each a circumferential cross-sectional view of the pair of first side wall portion 54A and second side wall portion 54B, and the first-stage stator vane 23A in the gas turbine 1 according to an embodiment.

As shown in FIGS. 3 to 9, the first-stage stator vanes 23A each include a rear part 66 including the trailing edge 65 and a front part 64 positioned upstream of the rear part 66.

As shown in FIGS. 5 to 9, the first side wall portion 54A and the second side wall portion 54B respectively have inner wall surfaces 58A, 58B which extend along a plane including the axial direction and the radial direction, and downstream end surfaces 55A, 55B which have flat surfaces along an orthogonal plane in the axial direction. The inner wall surfaces 58A, 58B respectively form combustion gas flow passages where combustion gases generated by the first combustor 4A and the second combustor 4B flow.

Figure 5:
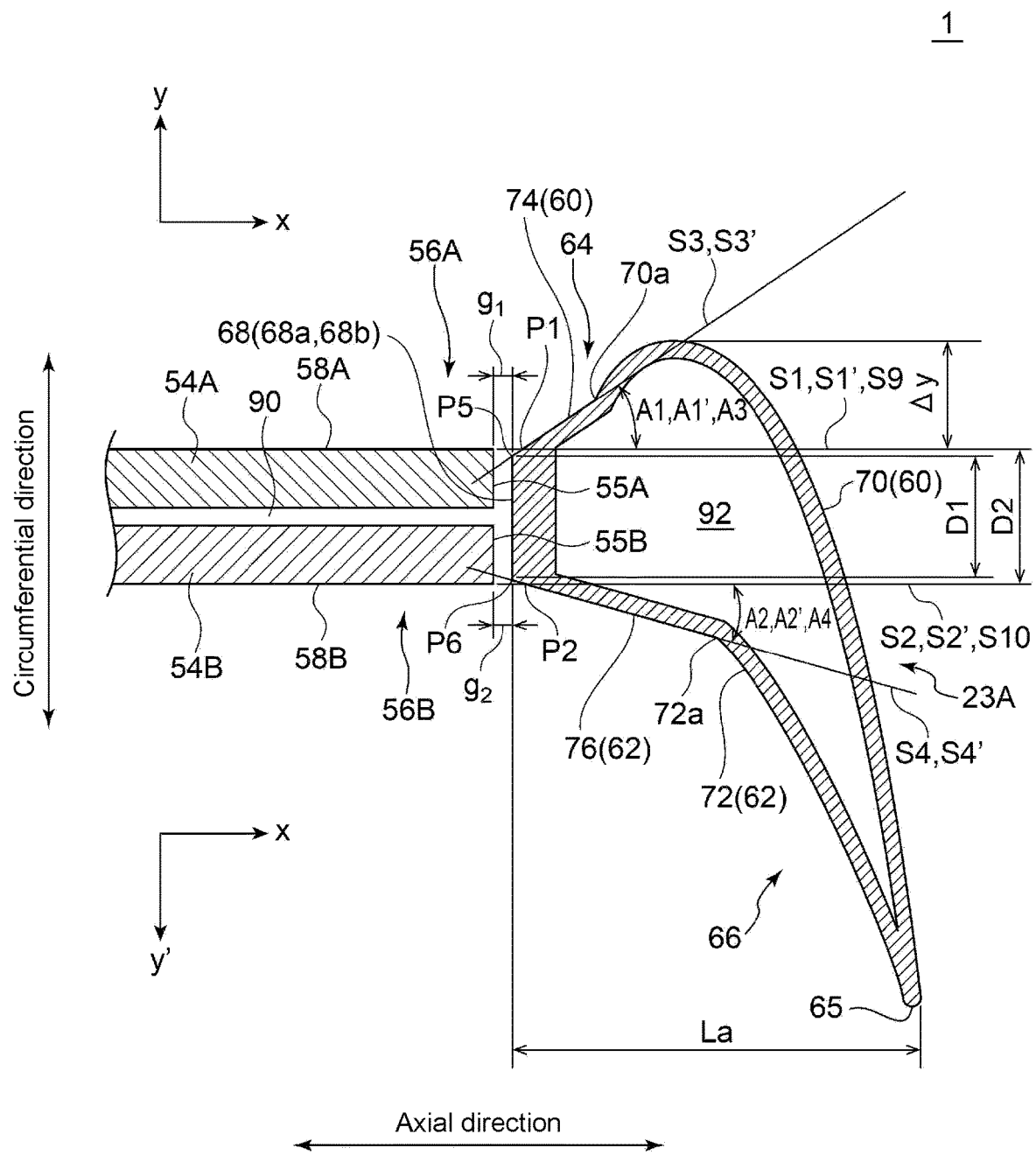
FIG. 5 is a circumferential cross-sectional view of a pair of first side wall portion and second side wall portion, and a first-stage stator vane in the gas turbine according to an embodiment.
Figure 8:
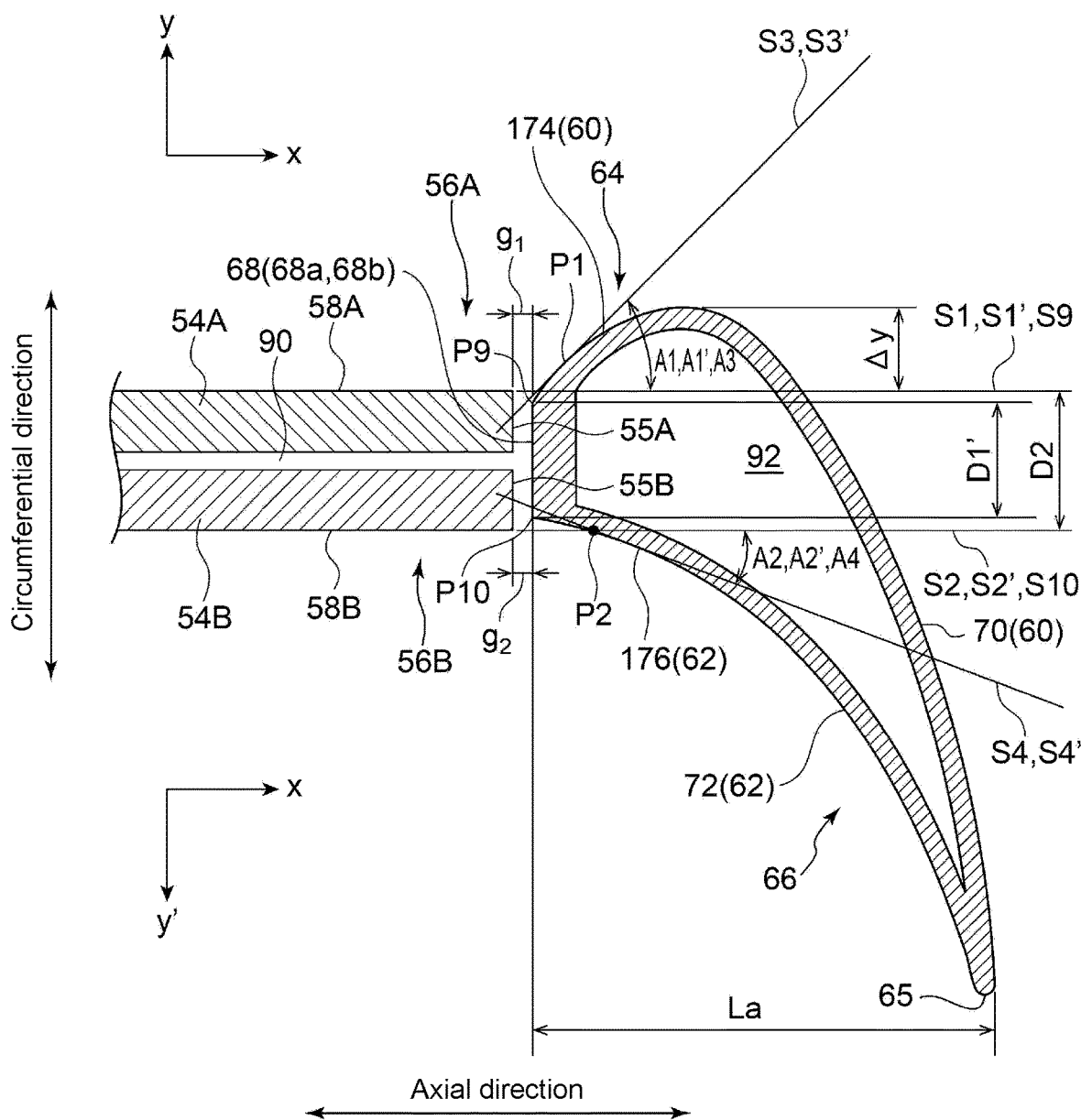
FIG. 8 is a circumferential cross-sectional view of the pair of first side wall portion and second side wall portion, and the first-stage stator vane in the gas turbine according to an embodiment.

In the embodiments shown in FIGS. 5 and 8, the downstream end surfaces 55A, 55B of the first side wall portion 54A and the second side wall portion 54B are respectively formed by the flat surfaces along the orthogonal plane in the axial direction.

Figure 6:
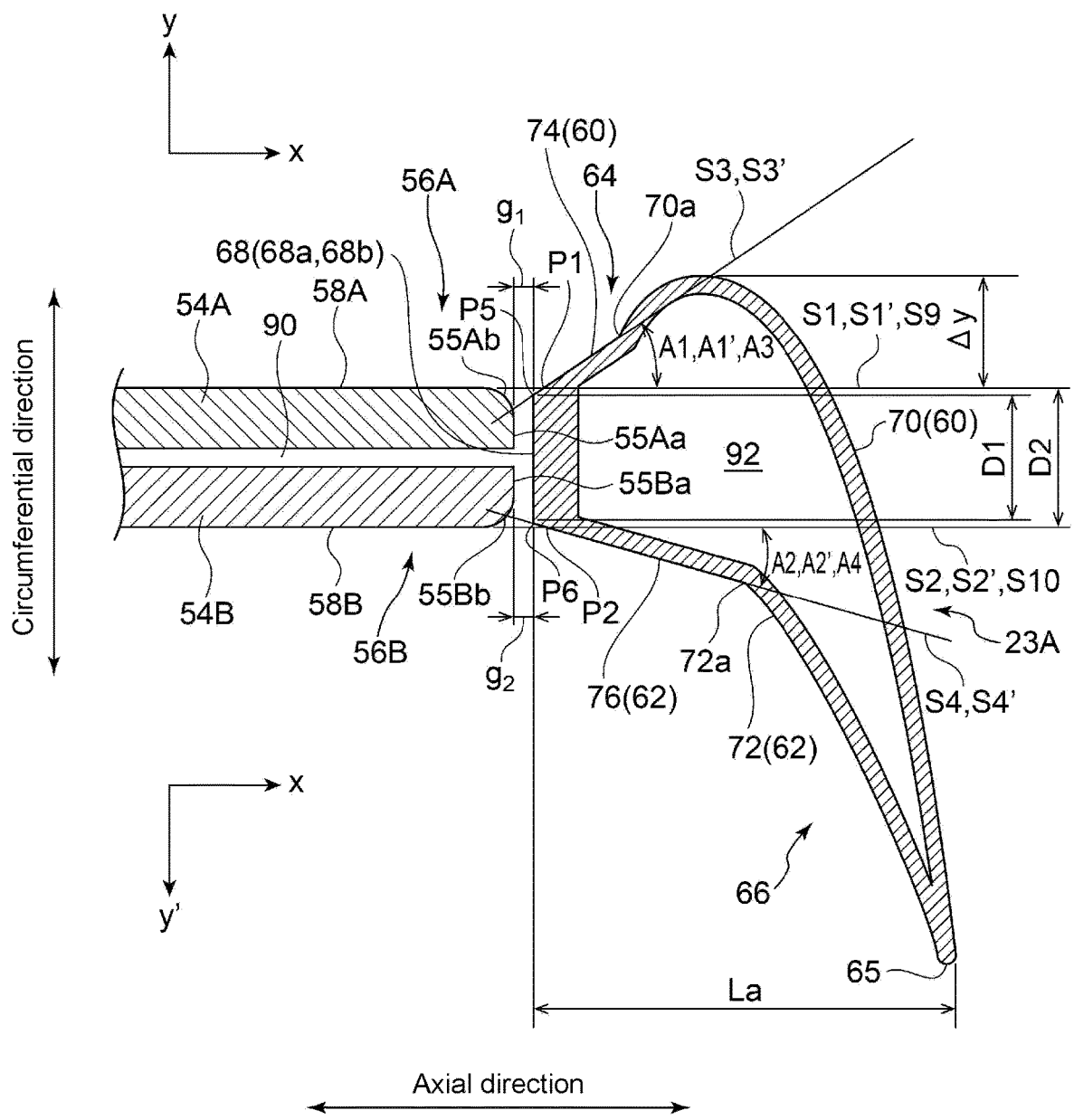
FIG. 6 is a circumferential cross-sectional view of the pair of first side wall portion and second side wall portion, and the first-stage stator vane in the gas turbine according to an embodiment.

In the embodiment shown in FIG. 6, the downstream end surfaces 55A, 55B of the first side wall portion 54A and the second side wall portion 54B respectively include flat portions 55Aa, 55Ba formed by flat surfaces along the orthogonal plane in the axial direction, and corner portions 55Ab, 55Bb which are formed by curved surfaces smoothly connecting the flat portions 55Aa, 55Ba and the inner wall surfaces 58A, 58B.

Figure 7:
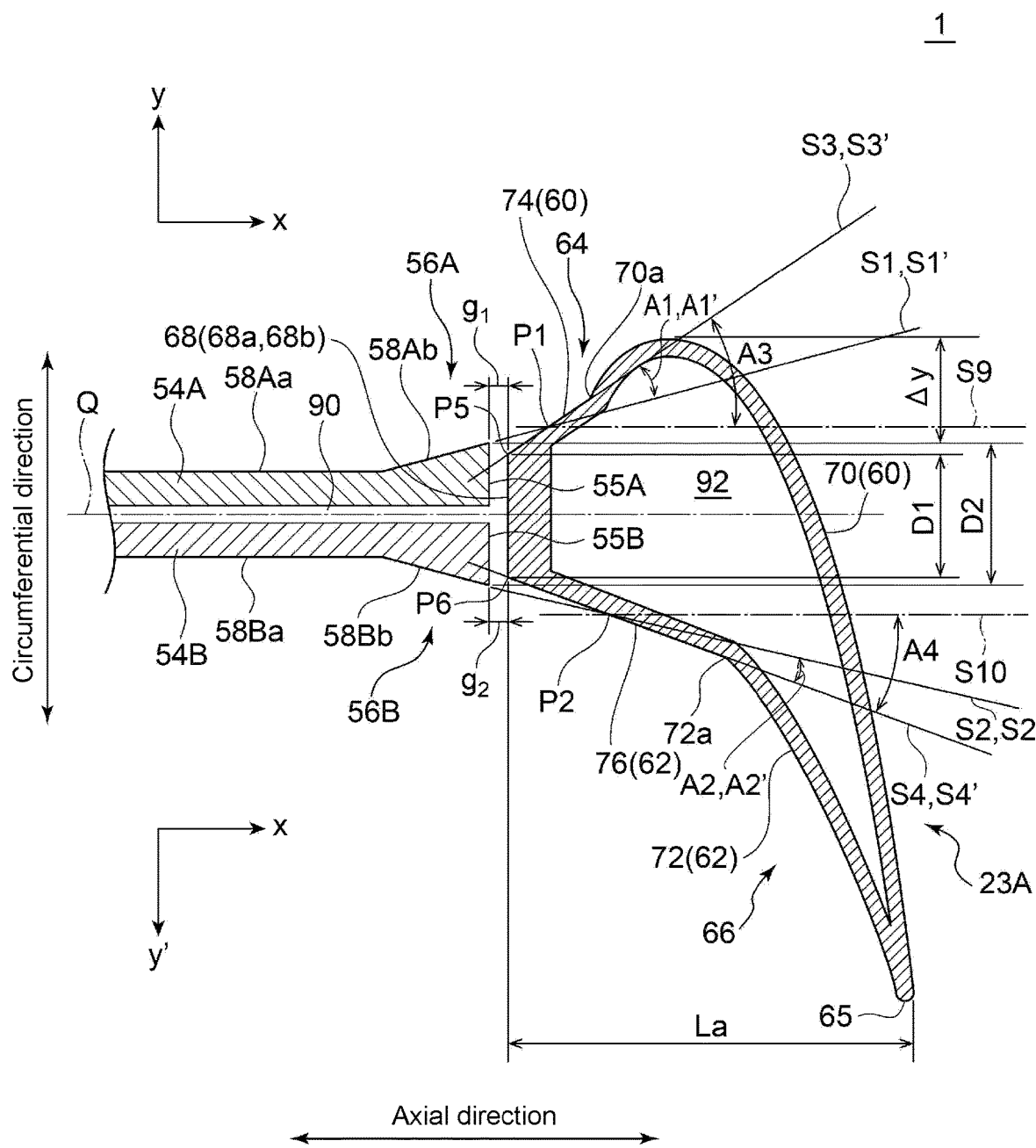
FIG. 7 is a circumferential cross-sectional view of the pair of first side wall portion and second side wall portion, and the first-stage stator vane in the gas turbine according to an embodiment.

In the embodiment shown in FIG. 7, the downstream end surfaces 55A, 55B of the first side wall portion 54A and the second side wall portion 54B are respectively formed by the flat surfaces along the orthogonal plane in the axial direction. Moreover, the inner wall surfaces 58A, 58B of the first side wall portion 54A and the second side wall portion 54B respectively include flat portions 58Aa, 58Ba extending along the plane including the axial direction and the radial direction, and inclined portions 58Ab, 58Bb which are formed by inclined surfaces disposed to be distanced from a center line Q as the surfaces approach downstream in the downstream end parts 56A, 56B of the first side wall portion 54A and the second side wall portion 54B.

The center line Q is a straight line extending along the axial direction between the first side wall portion 54A and the second side wall portion 54B in a cross section along the circumferential direction.

Figure 9:
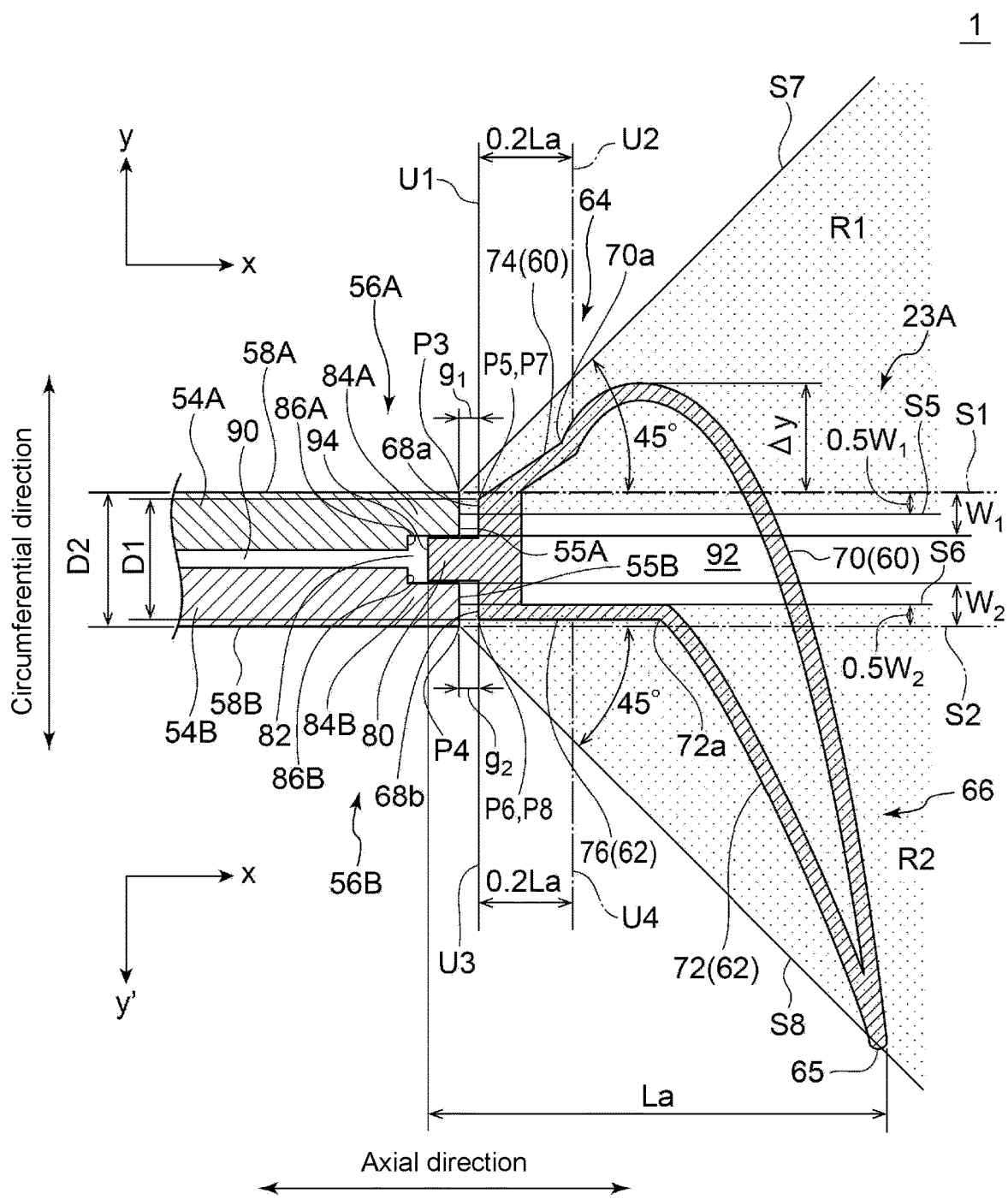
FIG. 9 is a circumferential cross-sectional view of the pair of first side wall portion and second side wall portion, and the first-stage stator vane in the gas turbine according to an embodiment.

In the embodiment shown in FIG. 9, the front part 64 of the first-stage stator vane 23A includes a protruding portion 80 of a shape protruding in the axial direction. Furthermore, in the downstream end parts 56A, 56B of the first side wall portion 54A and the second side wall portion 54B, stepped surfaces 86A, 86B and the side surfaces of protruding end portions 84A, 84B form a protruding portion receiving space 82. The stepped surfaces 86A, 86B are positioned upstream of the downstream end surfaces 55A, 55B. The protruding end portions 84A, 84B are portions downstream of the stepped surfaces 86A, 86B. Then, the protruding portion 80 of the first-stage stator vane 23A is engaged with the protruding portion receiving space 82 formed by the first side wall portion 54A and the second side wall portion 54B.

Although not illustrated in particular, in other embodiments, the protruding portion receiving space engaged with the protruding portion 80 of the first-stage stator vane 23A may be formed by one of the first side wall portion 54A or the second side wall portion 54B.

Alternatively, in other embodiments, the first-stage stator vane 23A may include a recessed portion of a shape recessed in the axial direction, and at least one of the first side wall portion 54A and the second side wall portion 54B may be provided with a protruding portion engageable with the recessed portion so that the protruding portion engages with the recessed portion.

The gas turbine 1 according to the embodiments shown in FIGS. 5 to 9 has features I to III to be described below.

(I. Axial Gap Between Side Wall Portion and First-stage Stator Vane Etc.)

First, the gas turbine 1 has a configuration satisfying (a) or (b) to be described below.

(a) Each of a minimum gap $g_1$ in the axial direction between the first side wall portion 54A and the front part 64 of the first-stage stator vane 23A, and a minimum gap $g_2$ in the axial direction between the second side wall portion 54B and the front part 64 of the first-stage stator vane 23A is not greater than 10% of a length La of the first-stage stator vane 23A in the axial direction.

(b) A most upstream point 94 (see FIG. 8) in the front part 64 of the first-stage stator vane 23A is positioned upstream of a most downstream end of at least one of the first side wall portion 54A or the second side wall portion 54B in the axial direction.

The gas turbine 1 shown in FIGS. 5 to 8 satisfies the above (a), and the gas turbine 1 shown in FIG. 9 satisfies the above (b).

When the gas turbine 1 satisfies the above-described (a) or (b), the minimum gaps $g_1$, $g_2$ between the front part 64 of the first-stage stator vane 23A, and the first side wall portion 54A and the second side wall portion 54B are sufficiently small (in the case of the above (a)) or no gap is formed between the front part 64 of the first-stage stator vane 23A, and the first side wall portion 54A and the second side wall portion 54B (in the case of the above (b)).

Thus, since the flow of the high-temperature combustion gas flowing between the front part 64 of the first-stage stator vane 23A and the first side wall portion 54A or the second side wall portion 54B is reduced, it is possible to reduce the flow rate of the cooling medium needed to cool the first-stage stator vane 23A.

The cooling medium (for example, air) for cooling the first-stage stator vane 23A may be supplied to the inner wall surface or the outer wall surface of the first-stage stator vane 23A via, for example, a cavity 92 formed inside the first-stage stator vane 23A or a gap 90 extending in the axial direction between the first side wall portion 54A and the second side wall portion 54B.

(II. Connection Between Inner Wall Surface of Side Wall Portion and Vane Surface of First-Stage Stator Vane)

Next, in the gas turbine 1, the inner wall surface 58A of the first side wall portion 54A and the suction surface 60 of the first-stage stator vane 23A are smoothly connected, as will be described below. In addition, the inner wall surface 58B of the second side wall portion 54B and the pressure surface 62 of the first-stage stator vane 23A may smoothly be connected.

The axial direction from upstream toward downstream of the gas turbine 1 is defined as the x-axis, the circumferential direction from an outer side toward an inner side of the first side wall portion is defined as the y-axis, and the circumferential direction from an outer side toward an inner side of the second side wall portion is defined as the y'-axis (see FIGS. 5 to 8).

In some embodiments, for example, as shown in FIGS. 5 to 8, in the cross section along the circumferential direction, a first angle A1 formed by a first tangent line S3 to the suction surface 60 in the front part 64 of the first-stage stator vane 23A with respect to a first reference tangent line S1 is not greater than 45 degrees. The first tangent line S3 passes through an intersection point between P1 the suction surface 60 and the first reference tangent line S1. The first reference tangent line S1 passes through a position at which a slope dy/dx of the inner wall surface 58A in the downstream end part 56A of the first side wall portion 54A s maximum, and extends downstream of the inner wall surface 58A.

The position at which the slope dy/dx of the inner wall surface 58A is maximum is the flat inner wall surface 58A along the axial direction in the embodiments shown in FIGS. 5, 6, and 8, and the inclined portion 58Ab of the inner wall surface 58A which is formed by the inclined surface disposed to be distanced from the center line Q as the surface approaches downstream.

Alternatively, in some embodiments, for example, as shown in FIGS. 5 to 8, a first angle A1' formed by a first tangent line S3' to the suction surface 60 in the front part 64 at a circumferential position at the downstream end of the inner wall surface 58A of the first side wall portion 54A with respect to an extended line S1' downstream of the inner wall surface 58A of the first side wall portion 54A is not greater than 45 degrees.

Alternatively, in some embodiments, for example, as shown in FIG. 9, in the cross section along the circumferential direction, the suction surface 60 in the front part 64 of the one first-stage stator vane 23A is included in a first region R1 within an axial range between a position at an upstream end P7 of a part of the suction surface 60 in the front part 64 included in the first region R1 and a position downstream by a length of 0.2La from the position P7 (a range between a straight line U1 and a straight line U2 in FIG. 8), where La is a length of the one first-stage stator vane 23A in the axial direction.

The first region R1 is a region between an illustrated first outer boundary line S5 and first inner boundary line S7. The first outer boundary line S5 is a straight line obtained by displacing the first reference tangent line S1 to a negative direction of the y-axis by $0.5 \times W_1$, where $W_1$ is a thickness of the downstream end of the first side wall portion 54A in the circumferential direction. The first reference tangent line S1 passes through a first reference position P3 at which the slope dy/dx of the inner wall surface 58A in the downstream end part 56A of the first side wall portion 54A is maximum, and extends downstream of the inner wall surface 58A. Further, the first inner boundary line S7 is a straight line passing through the first reference position P3 and forming a 45-degree angle with respect to the first reference tangent line S1.

The first inner boundary line S7 may be a straight line passing through the first reference position P3 and forming a 40-degree or 35-degree angle with respect to the first reference tangent line S1.

Since the first inner wall surface 58A of the first side wall portion 54A and the suction surface 60 of the first-stage stator vane 23A are thus smoothly connected, it is possible to reduce turbulence in the flow of the high-temperature combustion gas from the first combustor outlet 52A.

In some embodiments, for example, as shown in FIGS. 5 to 8, in the cross section along the circumferential direction, a second angle A2 formed by a second tangent line S4 to the pressure surface 62 in the front part 64 of the first-stage stator vane 23A with respect to a second reference tangent line S2 is not greater than 45 degrees. The second tangent line S4 passes through an intersection point P2 between the pressure surface 62 and the second reference tangent line S2. The second reference tangent line S2 passes through a position at which a slope dy'/dx of the inner wall surface 58B in the downstream end part 56B of the second side wall portion 54B is maximum, and extends downstream of the inner wall surface 58B.

The position at which the slope dy'/dx of the inner wall surface 58B is maximum is the flat inner wall surface 58B along the axial direction in the embodiments shown in FIGS. 5, 6, and 8, and the inclined portion 58Bb of the inner wall surface 58B which is formed by the inclined surface disposed to be distanced from the center line Q as the surface approaches downstream.

Alternatively, in some embodiments, for example, as shown in FIGS. 5 to 8, a second angle A2' formed by a second tangent line S4' to the pressure surface 62 in the front part 64 at a circumferential position at the downstream end of the inner wall surface 58B of the second side wall portion 54B with respect to an extended line S2' downstream of the inner wall surface 58B of the second side wall portion 54B is not greater than 45 degrees.

Alternatively, in some embodiments, for example, as shown in FIG. 9, in the cross section along the circumferential direction, the pressure surface 62 in the front part 64 of the one first-stage stator vane 23A is included in a second region R2 within an axial range between the position at the upstream end P7 of the part of the suction surface 60 in the front part 64 included in the first region R1 and a position P8 downstream by the length of 0.2La from the position P7 (a range between a straight line U3 and a straight line U4 in FIG. 9), where La is the length of the one first-stage stator vane 23A in the axial direction.

The second region R2 is a region between an illustrated second outer boundary line S6 and second inner boundary line S8. The second outer boundary line S6 is a straight line obtained by displacing the second reference tangent line S2 to a negative direction of the y'-axis by $0.5 \times W_2$, where $W_2$ is a thickness of the downstream end of the second side wall portion 54B in the circumferential direction. The second reference tangent line S2 passes through a second reference position P4 at which the slope dy'/dx of the inner wall surface 58B in the downstream end part 56B of the second side wall portion 54B is maximum, and extends downstream of the inner wall surface 58B. The second inner boundary line S8 is a straight line passing through the second reference position P4 and forming a 45-degree angle with respect to the second reference tangent line S2.

The second inner boundary line S8 may be a straight line passing through the second reference position P4 and forming a 35-degree or 25-degree angle with respect to the second reference tangent line S2.

Since the inner wall surface 58B of the second side wall portion 54B and the pressure surface 62 of the first-stage stator vane 23A are thus smoothly connected, it is possible to reduce turbulence in the flow of the high-temperature combustion gas from the second combustor outlet 52B.

(III. Circumferential Protruding Amount of Suction Surface of First-stage Stator Vane)

Then, in the gas turbine 1, in the cross section along the circumferential direction, the first-stage stator vane 23A satisfies 0.05≤Δy/P≤0.25, where Δy is a protruding amount of the suction surface 60 from the inner wall surface 58A at the downstream end of the first side wall portion 54A to the circumferential direction, and P is an arrangement pitch of the first-stage stator vanes 23 (23A, 23B) in the circumferential direction (see FIGS. 3 and 4). A ratio Δy/P of the protruding amount Δy of the first-stage stator vane 23A to the arrangement pitch P described above may be 0.1≤Δy/P≤0.2.

The arrangement pitch P of the first-stage stator vanes 23 (23A, 23B) in the circumferential direction is the arrangement pitch P between the first-stage stator vane 23A (one first-stage stator vane) and the plurality of first-stage stator vanes 23 including the first-stage stator vane 23B other than the first-stage stator vanes 23A.

For example, in the exemplary embodiment shown in FIG. 3, the plurality of first-stage stator vanes 23 include only the first-stage stator vanes 23A, and the first-stage stator vanes 23, 23 adjacent in the circumferential direction are both the first-stage stator vanes 23A. In this case, the arrangement pitch P of the first-stage stator vanes 23 in the circumferential direction is a pitch between the first-stage stator vanes 23A and 23A adjacent in the circumferential direction (for example, a distance between the trailing edges 65, 65 of the adjacent first-stage stator vanes 23A, 23A).

Moreover, for example, in the exemplary embodiment shown in FIG. 4, the plurality of first-stage stator vanes 23 include the first-stage stator vanes 23A and the first-stage stator vane 23B alternately arranged in the circumferential direction, and the first-stage stator vanes 23, 23 adjacent in the circumferential direction are the first-stage stator vane 23A and the first-stage stator vane 23B. In this case, the arrangement pitch P of the first-stage stator vanes 23 in the circumferential direction is a pitch between the first-stage stator vane 23A and the first-stage stator vane 23B adjacent in the circumferential direction (for example, a distance between the trailing edge 65 of the first-stage stator vane 23A and the trailing edge 65 of the first-stage stator vane 23B adjacent to the first-stage stator vane 23A).

The present inventors find that a pressure difference between the pressure surface side 62 and the suction surface side 60 of the first-stage stator vane 23A changes in accordance with the ratio (Δy/P) of the protruding amount Δy of the suction surface 60 of the first-stage stator vane 23A from the inner wall surface 58A of the first side wall portion 54A to the circumferential direction to the arrangement pitch P of the first-stage stator vanes 23A in the circumferential direction, and the pressure difference can be reduced by setting Δy/P to an appropriate value.

Figure 10:
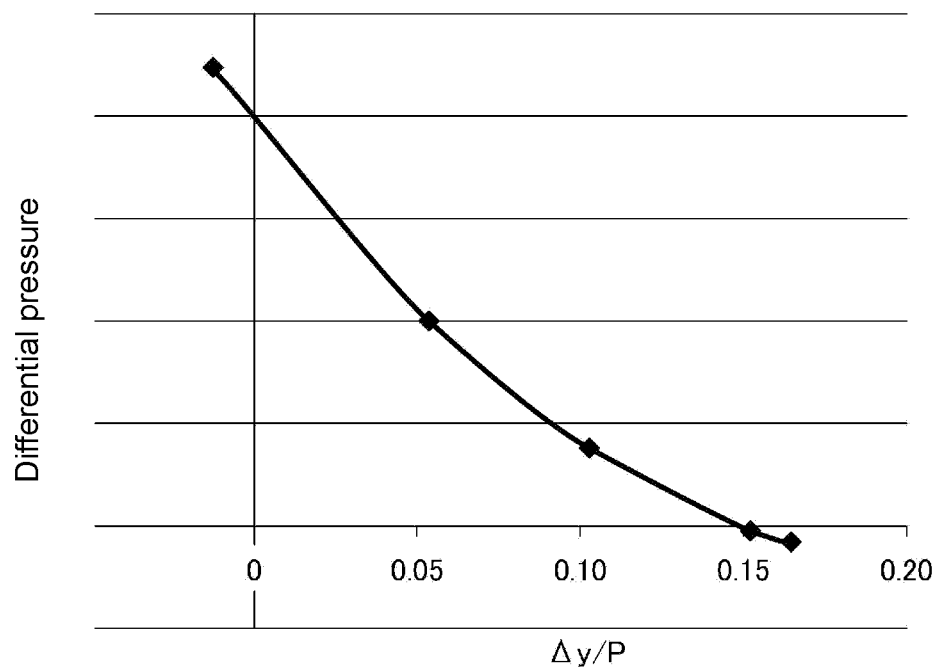
FIG. 10 is a graph showing an example of a correlation between the ratio (Δy/P) of a circumferential protruding amount Δy of a suction surface of the first-stage stator vane to an arrangement pitch P, and a pressure difference between a pressure surface side and a suction surface side of the first-stage stator vane.

FIG. 10 is a graph showing an example of a correlation between the ratio (Δy/P) of the above-described protruding amount Δy of the suction surface 60 of the first-stage stator vane 23A to the arrangement pitch P, and the pressure difference between the pressure surface side and the suction surface side of the first-stage stator vane. In the graph of FIG. 10, the ordinate indicates the pressure difference between the pressure surface side 62 and the suction surface side 60 of the first-stage stator vane 23A (the pressure on the pressure surface side 62—the pressure on the suction surface side 60), and the abscissa indicates the ratio (Δy/P) of the above-described protruding amount Δy to the arrangement pitch P.

As shown by the graph of FIG. 10, the pressure difference between the pressure surface side 62 and the suction surface side 60 of the first-stage stator vane 23A (the pressure on the pressure surface side 62—the pressure on the suction surface side 60) tends to decrease as Δy/P increases.

For example, the above-described protruding amount Δy of the suction surface 60 of the first-stage stator vane 23A is zero (that is, in the case of Δy/P=0), the pressure difference between the pressure surface side 62 and the suction surface side 60 of the first-stage stator vane 23A is relatively large. In this case, due to the pressure difference, the high-temperature gases flow via the axial gaps between the front part 64 of the first-stage stator vane 23A, and the first combustor outlet 52A and the second combustor outlet 52B.

On the other hand, the pressure difference between the pressure surface side 62 and the suction surface side 60 of the first-stage stator vane 23A is zero when Δy/P is set to a predetermined value C (when Δy/P is about 0.13 in the example shown by the graph of FIG. 10). Thus, the above-described pressure difference is relatively small when Δy/P is set to a value in the vicinity of the predetermined value C, reducing the flow of the high-temperature gas via an axial gap between the first combustor outlet 52A and the second combustor outlet 52B.

In this regard, as described above, since the protruding amount Δy of the suction surface 60 of the first-stage stator vane 23A from the inner wall surface 58A of the first side wall portion 54A to the circumferential direction and the arrangement pitch P of the first-stage stator vanes 23A in the circumferential direction satisfy 0.05≤Δy/P≤0.25, the pressure difference between the pressure surface side 62 and the suction surface side 60 of the first-stage stator vane 23A is relatively small. Thus, occurrence of the flows of the high-temperature gases via the axial gaps between the front part 64 of the first-stage stator vane 23A, and the first combustor outlet 52A and the second combustor outlet 52B due to the pressure difference between the pressure surface side 62 and the suction surface side 60 of the first-stage stator vane 23A are suppressed, making it possible to reduce the flow rate of the cooling medium needed to cool the first-stage stator vane 23A.

Further, the pressure difference between the pressure surface side 62 and the suction surface side 60 of the first-stage stator vane 23A is relatively small, if the ratio of the above-described protruding amount Δy to the arrangement pitch P satisfies 0.1≤Δy/P≤0.2. Thus, it is possible to further suppress occurrence of the flows of the high-temperature gases via the axial gaps between the front part 64 of the first-stage stator vane 23A, and the first combustor outlet 52A and the second combustor outlet 52B due to the pressure difference between the pressure surface side 62 and the suction surface side 60 of the first-stage stator vane 23A. Therefore, it is possible to effectively reduce the flow rate of the cooling medium needed to cool the first-stage stator vane 23A.

As described above, since the gas turbine 1 has the above-described features I to III, it is possible to efficiently cool the first-stage stator vane 23A while reducing turbulence in the flows of the high-temperature combustion gases from the first combustor outlet 52A and the second combustor outlet 52B. Thus, it is possible to suppress an efficiency decrease of the gas turbine 1.

The gas turbine 1 may further have features to be described below.

In some embodiments, the above-described first angle A1 on the suction surface side 60 (see FIGS. 5 to 8) may be not less than 20 degrees and not greater than 45 degrees, and the above-described second angle A2 on the pressure surface side 62 (see FIGS. 5 to 8) may be not less than 0 degrees and not greater than 25 degrees.

In this case, since the first angle A1 on the suction surface side 60 is set to not less than 20 degrees and not greater than 45 degrees, a static pressure increases on the suction surface side 60 due to a collision of a combustion-gas flow against the suction surface 60 of the first-stage stator vane 23A. On the other hand, since the second angle A2 on the pressure surface side 62 is set to not less than 0 degrees and not greater than 25 degrees, the pressure surface 62 recedes downstream of the combustion-gas flow as compared with a case in which the second angle A2 is greater than 25 degrees, making it possible to reduce the pressure on the pressure surface side 62 in the vicinity of the gap described above. Thus, it is possible to suppress occurrence of the flows of the high-temperature gases via the gaps between the front part 64 of the first-stage stator vane 23A, and the first combustor outlet 52A and the second combustor outlet 52B.

In some embodiments, the above-described first angle A1 on the suction surface side 60 is not less than the above-described second angle A2 on the pressure surface side 62.

Thus, since the first angle A1 on the suction surface side 60 is not less than the second angle A2 on the pressure surface side 62, it is possible to increase the pressure on the suction surface side 60 while decreasing the pressure on the pressure surface side 62. Thus, it is possible to effectively suppress occurrence of the flows of the high-temperature gases via the gaps between the front part 64 of the first-stage stator vane 23A, and the first combustor outlet 52A and the second combustor outlet 52B.

Moreover, in some embodiments, in the cross section along the circumferential direction, an angle A3 formed by a first tangent line S3 in the front part 64 of the first-stage stator vane 23A with respect to a straight line S9 in the axial direction (see FIGS. 5 to 8) is not less than 15 degrees and not greater than 45 degrees.

Since the angle A3 formed by the first tangent line S3 to the suction surface 60 with respect to the axial direction is thus set to not less than 15 degrees and not greater than 45 degrees, the static pressure is likely to increase on the suction surface side 60 due to the collision of the combustion-gas flow against the suction surface 60 of the first-stage stator vane 23A. Thus, it is possible to effectively suppress occurrence of the flows of the high-temperature gases via the gaps between the front part 64 of the first-stage stator vane 23A, and the first combustor outlet 52A and the second combustor outlet 52B.

Moreover, in some embodiments, in the cross section along the circumferential direction, an angle A4 formed by a second tangent line S4 in the front part 64 of the first-stage stator vane 23A with respect to a straight line S10 in the axial direction (see FIGS. 5 to 8) is not less than 0 degrees and not greater than 30 degrees.

Since the angle A4 formed by the second tangent line S4 to the pressure surface 62 with respect to the axial direction is thus set to not less than 0 degrees and not greater than 30 degrees, the pressure surface 62 recedes downstream of the combustion-gas flow as compared with a case in which the angle A4 is greater than 30 degrees, the pressure on the pressure surface side 62 in the vicinity of the gaps between the front part 64 of the first-stage stator vane 23A, and the first combustor outlet 52A and the second combustor outlet 52B is decreased easily. Thus, it is possible to effectively suppress occurrence of the flows of the high-temperature gases via the above-described gaps with the front part 64 of the first-stage stator vane 23A.

In some embodiments, for example, as shown in FIGS. 5 to 9, the downstream end surface 55A of the first side wall portion 54A and the downstream end surface 55B of the second side wall portion 54B respectively include the flat surfaces along the orthogonal plane in the axial direction, as described above. Further, the front part 64 of the first-stage stator vane 23A has a front end surface 68 facing the downstream end surface 55A of the first side wall portion 54A and the downstream end surface 55B of the second side wall portion 54B. Then, at least a part of the front end surface 68 is a flat surface disposed along the orthogonal plane in the axial direction.

In the embodiments shown in FIGS. 5 to 8, the front end surface 68 of the first-stage stator vane 23A is formed by a flat surface along the orthogonal plane in the axial direction. In addition, in the embodiment shown in FIG. 9, the front end surface 68 of the first-stage stator vane 23A includes a first flat surface 68a and a second flat surface 68b formed by flat surfaces along the orthogonal plane in the axial direction. The first flat surface 68a is disposed so as to face the downstream end surface 55A of the first side wall portion 54A, and the second flat surface 68b is disposed so as to face the downstream end surface 55B of the second side wall portion 54B.

In this case, management of the axial gaps between the front part 64 of the first-stage stator vane 23A, and the first combustor outlet 52A and the second combustor outlet 52B is easier than in a case in which the downstream end surfaces 55A, 55B of the first side wall portion 54A and the second side wall portion 54B or the front end surface 68 in the front part 64 of the first-stage stator vane 23A is formed by a curved surface. Therefore, the flow rate of the cooling medium needed to cool the first-stage stator vane 23A is reduced easily.

In some embodiments, for example, as shown in FIGS. 5 to 9, the rear part 66 positioned downstream of the front part 64 of the first-stage stator vane 23A has a convex curved surface 70 and a concave curved surface 72. The convex curved surface 70 is a trailing edge region of the suction surface 60. The concave curved surface 72 is a trailing edge region of the pressure surface 62.

In some embodiments, for example, as shown in FIGS. 5 to 9, a leading edge end 70a of the convex curved surface 70 of the suction surface 60 is closer to the second side wall portion 54B in the circumferential direction than a portion of the suction surface 60 protruding the most from the inner wall surface 58A of the first side wall portion 54A to the circumferential direction (a portion of a position at which the protruding amount is Δy).

In this case, the combustion-gas flow from the first combustor outlet 52A is likely to collide against the suction surface 60 of the first-stage stator vane 23A, and thus the static pressure is likely to increase on the suction surface side 60. Thus, the pressure difference between the suction surface side 60 and the pressure surface side 62 is reduced, making it possible to effectively suppress occurrence of the flows of the high-temperature gases via the gaps between the front part 64 of the first-stage stator vane 23A, and the first combustor outlet 52A and the second combustor outlet 52B.

Further, in some embodiments, for example, as shown in FIGS. 5 to 7 and 9, the front part 64 of the first-stage stator vane 23A has a linear first surface 74 and a linear second surface 76. The first surface 74 forms a leading edge region of the suction surface 60. The second surface 76 forms a leading edge region of the pressure surface 62. The first surface 74 linearly extends from the leading edge end 70a of the convex curved surface 70 toward the first side wall portion 54A so as to form the leading edge region of the suction surface 60. Further, the second surface 76 linearly extends from a leading edge end 72a of the concave curved surface 72 toward the second side wall portion 54B so as to form the leading edge region of the pressure surface 62.

In this case, the leading edge region of the suction surface 60 is formed by the first surface 74 extending linearly, and the leading edge region of the pressure surface 62 is formed by the second surface 76 extending linearly, and thus the first-stage stator vane 23A is manufactured relatively easily.

In the exemplary embodiment shown in FIG. 8, the front part 64 of the first-stage stator vane 23A has a first surface 174 and a second surface 176. The first surface 174 forms a leading edge region of the suction surface 60. The second surface 176 forms a leading edge region of the pressure surface 62. The first surface 174 has a shape curved into a convex shape and extends to be smoothly connected to the convex curved surface 70 so as to form the leading edge region of the suction surface 60. Further, the second surface 176 has a shape curved into a concave shape and extends to be smoothly connected to the concave curved surface 72 so as to form the leading edge region of the pressure surface 62.

In some embodiments, for example, as shown in FIGS. 5 to 9, the downstream end surface 55A of the first side wall portion 54A and the downstream end surface 55B of the second side wall portion 54B respectively include the flat surfaces along the orthogonal plane in the axial direction. Then, the front part 64 of the first-stage stator vane 23A has the first flat surface 68a and the second flat surface 68b. The first flat surface 68a extends along the orthogonal plane in the axial direction so as to face the downstream end surface 55A of the first side wall portion 54A. The second flat surface 68b extends along the orthogonal plane in the axial direction so as to face the downstream end surface 55B of the second side wall portion 54B. In the embodiments shown in FIGS. 5 to 7 and 9, the first flat surface 68a has a first connection point P5 is connected to the leading edge end of the linear first surface 74. The second flat surface 68b has a second connection point P6 connected to the leading edge end of the linear second surface 76. In addition, in the embodiment shown in FIG. 8, the first flat surface 68a has a third connection point P9 and a fourth connection point P10. The third connection point P9 is connected to the leading edge end of the first surface 174. The fourth connection point P10 is connected to the leading edge end of the second surface 176.

In the embodiments shown in FIGS. 5 to 8, both of the first flat surface 68a and the second flat surface 68b are the front end surface 68 facing the downstream end surfaces 55A, 55B of the first side wall portion 54A and the second side wall portion 54B.

Since the first flat surface 68a and the second flat surface 68b in the front part 64 of the first-stage stator vane 23A thus respectively face the downstream end surfaces 55A, 55B of the first side wall portion 54A and the second side wall portion 54B including the flat surfaces, management of the axial gaps between the front part 64 of the first-stage stator vane 23A, and the first combustor outlet 52A and the second combustor outlet 52B is easier than in the case in which the downstream end surfaces 55A, 55B of the first side wall portion 54A and the second side wall portion 54B or the front end surface 68 in the front part 64 of the first-stage stator vane 23A is formed by the curved surface. Therefore, the flow rate of the cooling medium needed to cool the first-stage stator vane 23A is reduced easily.

In some embodiments, for example, as shown in FIGS. 5 to 7 and 9, a circumferential distance D1 between the first connection point P5 of the first flat surface 68a and the second connection point P6 of the second flat surface 68b is smaller than a circumferential distance D2 between the inner wall surface 58A of the first side wall portion 54A and the inner wall surface 58B of the second side wall portion 54B.

Moreover, in some embodiments, for example, as shown in FIG. 8, a circumferential distance D1' between the third connection point P9 and the fourth connection point P10 is smaller than the circumferential distance D2 between the inner wall surface 58A of the first side wall portion 54A and the inner wall surface 58B of the second side wall portion 54B.

In this case, the flows of the combustion gases from the first combustor outlets 52A and the second combustor outlet 52B less become turbulent as compared with a case in which the distance D1 between the first connection point P5 and the second connection point P6 or the distance D1' between the third connection point P9 and the fourth connection point P10 is larger than the distance D2 between the inner wall surface 58A of the first side wall portion 54A and the inner wall surface 58B of the second side wall portion 54B. Thus, occurrence of a fluid loss in the turbine 6 is suppressed easily.

In some embodiments, the first connection point P5 of the first flat surface 68a is positioned between the second side wall portion 54B and the inner wall surface 58A of the first side wall portion 54A in the circumferential direction.

In this case, the flow of the combustion gas from the first combustor outlet 52A less becomes turbulent on the suction surface side 60, suppressing occurrence of the fluid loss in the turbine 6 easily.

In some embodiments, the second connection point P6 of the second flat surface 68b is positioned between the first side wall portion 54A and the inner wall surface 58B of the second side wall portion 54B in the circumferential direction.

In this case, the flow of the combustion gas from the second combustor outlet 52B less becomes turbulent on the pressure surface side 62, suppressing occurrence of the fluid loss in the turbine 6 easily.

In some embodiments, the minimum gap $g_1$ in the axial direction between the first side wall portion 54A and the front part 64 of the first-stage stator vane 23A, and the minimum gap $g_2$ in the axial direction between the second side wall portion 54B and the front part 64 of the first-stage stator vane 23A satisfy $0.9 \leq g_1/g_2 \leq 1.1$.

In this case, since the size of the minimum gap $g_1$ on the suction surface side 60 and the size of the minimum gap $g_2$ on the pressure surface side 62 of the first-stage stator vane 23A are almost equal, it is possible to reduce a difference between amounts of the cooling medium distributed to the suction surface side 60 and the pressure surface side 62 respectively via the gaps between the front part 64 of the first-stage stator vane 23A, and the downstream end surfaces 55A, 55B of the first side wall portion 54A and the second side wall portion 54B. Thus, it is possible to reduce the flow rate of the cooling medium in the gas turbine 1 as a whole.

Embodiments of the present invention were described above, but the present invention is not limited thereto, and also includes an embodiment obtained by modifying the above-described embodiment and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "containing" or "having" one constitutional element is not an exclusive expression that excludes the presence of other constitutional elements.

REFERENCE SIGNS LIST

1 Gas turbine
2 Compressor
4 Combustor
4A First combustor
4B Second combustor
6 Turbine
8 Rotor
10 Compressor casing
12 Air inlet
16 Stator vane
18 Rotor blade
20 Casing
22 Turbine casing
23 First-stage stator vane
23A First-stage stator vane
23B First-stage stator vane
24 Stator vane
26 Rotor blade
28 Combustion gas flow passage
30 Exhaust chamber
32 Combustor casing
36 Combustor liner
38 First combustion burner
40 Second combustion burner
41 Casing inlet
42 Fuel port
44 Fuel port
48 Combustor basket
50 Transition piece
52 Outlet
52A First combustor outlet
52B Second combustor outlet
54 Side wall portion
54A First side wall portion
54B Second side wall portion
55A Downstream end surface
55Aa Flat portion
55Ab Corner portion
55B Downstream end surface
55Ba Flat portion
55Bb Corner portion
56A Downstream end part
56B Downstream end part
58A Inner wall surface
58Aa Flat portion
58Ab Inclined portion
58B Inner wall surface
58Ba Flat portion
58Bb Inclined portion
60 Suction surface
62 Pressure surface
63 Leading edge
64 Front part
65 Trailing edge
66 Rear part
68 Front end surface
68$a$ First flat surface
68$b$ Second flat surface
70 Convex curved surface
70$a$ Leading edge end
72 Concave curved surface
72$a$ Leading edge end
75 First surface
76 Second surface
80 Protruding portion
82 Protruding portion receiving space
84A Protruding end portion
84B Protruding end portion
86A Stepped surface
86B Stepped surface
90 Gap
92 Cavity
94 Most upstream point
174 First surface
176 Second surface
A1 First angle
A1' First angle
A2 Second angle
A2' Second angle
A3 Angle
A4 Angle
D1 Distance
D2 Distance
L Axial distance
P Arrangement pitch
P1 Intersection point
P2 Intersection point
P3 First reference position
P4 Second reference position
P5 First connection point
P6 Second connection point
P7 Upstream end
P8 Upstream end
P9 Third connection point
P10 Fourth connection point
Q Center line
R1 First region
R2 Second region S Circumferential distance
S1 First reference tangent line
S1' Extended line
S2 Second reference tangent line
S2' Extended line
S3 First tangent line
S3' First tangent line
S4 Second tangent line
S4' Second tangent line
S5 First outer boundary line
S6 Second outer boundary line
S7 First inner boundary line
S8 Second inner boundary line
g1 Minimum gap
g2 Minimum gap
Δy Protruding amount

The invention claimed is:

1. A gas turbine, comprising:
a plurality of first-stage stator vanes arranged in a circumferential direction, the first-stage stator vanes each including a vane surface having a pressure surface and a suction surface;
a first combustor disposed on a suction surface side of one of the first-stage stator vanes, the first combustor having a first combustor outlet which includes a first side wall portion extending along a radial direction; and
a second combustor disposed on a pressure surface side of the one of the first-stage stator vanes and adjacent to the first combustor in the circumferential direction, the second combustor having a second combustor outlet which includes a second side wall portion extending along the radial direction,
wherein the gas turbine satisfies one of condition (a) or (b) given below,
wherein, provided that an axial direction from upstream toward downstream is defined as an x-axis, and the circumferential direction from an outer side toward an inner side of the first side wall portion is defined as a y-axis, a first angle formed by a first tangent line to the suction surface with respect to a first reference tangent line is not greater than 45 degrees, the first tangent line passing through an intersection point between the suction surface in a front part of the one of the first-stage stator vanes and the first reference tangent line, the first reference tangent line passing through a position at which a slope $dy/dx$ of an inner wall surface in a downstream end part of the first side wall portion is maximum and extending downstream of the inner wall surface, and
wherein the one of the first-stage stator vanes satisfies $0.05 \le \Delta y/P \le 0.25$, where $\Delta y$ is a protruding amount of the suction surface from the inner wall surface of the first side wall portion to the circumferential direction, and P is an arrangement pitch of the first-stage stator vanes in the circumferential direction,
wherein the condition (a) is such that each of a minimum gap in the axial direction between the first side wall portion and the front part of the one of the first-stage stator vanes, and a minimum gap in the axial direction between the second side wall portion and the front part of the one of the first-stage stator vanes is not greater than 10% of a length La of the one of the first-stage stator vanes in the axial direction, and
wherein the condition (b) is such that a most upstream point in the front part of the one of the first-stage stator vanes is positioned upstream of a most downstream end of at least one of the first side wall portion or the second side wall portion in the axial direction.

2. The gas turbine according to claim 1,
wherein, provided that the circumferential direction from an outer side toward an inner side of the second side wall portion is defined as a y'-axis, a second angle formed by a second tangent line to the pressure surface with respect to a second reference tangent line is not greater than 45 degrees, the second tangent line passing through an intersection point between the pressure surface in the front part of the one of the first-stage stator vanes and the second reference tangent line, the second reference tangent line passing through a position at which a slope $dy'/dx$ of an inner wall surface in a downstream end part of the second side wall portion is maximum and extending downstream of the inner wall surface.

3. The gas turbine according to claim 2,
wherein the first angle is not less than 20 degrees and not greater than 45 degrees, and
wherein the second angle is not less than 0 degrees and not greater than 25 degrees.

4. The gas turbine according to claim 2,
wherein the first angle is not less than the second angle.

5. The gas turbine according to claim 1,
wherein the first side wall portion and the second side wall portion respectively have downstream end surfaces each including a flat surface along an orthogonal plane in the axial direction,
wherein the front part has a front end surface facing the downstream end surface of the first side wall portion and the downstream end surface of the second side wall portion, and
wherein at least a part of the front end surface is a flat surface disposed along the orthogonal plane in the axial direction.

6. The gas turbine according to claim 1,
wherein the one of the first-stage stator vanes includes a rear part positioned downstream of the front part, and having a convex curved surface and a concave curved surface, the convex curved surface being a trailing edge region of the suction surface, the concave curved surface being a trailing edge region of the pressure surface, and
wherein a leading edge end of the convex curved surface of the suction surface is closer to the second side wall portion in the circumferential direction than a portion of the suction surface protruding the most from the inner wall surface of the first side wall portion to the circumferential direction.

7. The gas turbine according to claim 1,
wherein the one of the first-stage stator vanes includes a rear part positioned downstream of the front part, and having a convex curved surface and a concave curved surface, the convex curved surface being a trailing edge region of the suction surface, the concave curved surface being a trailing edge region of the pressure surface, and
wherein the front part includes:
a first surface linearly extending from a leading edge end of the convex curved surface toward the first side wall portion so as to form a leading edge region of the suction surface; and
a second surface linearly extending from a leading edge end of the concave curved surface toward the second side wall portion so as to form a leading edge region of the pressure surface.

8. The gas turbine according to claim 7,
wherein the first side wall portion and the second side wall portion respectively have downstream end surfaces each including a flat surface along an orthogonal plane in the axial direction, and
wherein the front part includes:
a first flat surface which has a first connection point connected to a leading edge end of the first surface and extends along the orthogonal plane in the axial direction so as to face the downstream end surface of the first side wall portion; and
a second flat surface which has a second connection point connected to a leading edge end of the second surface and extends along the orthogonal plane in the axial direction so as to face the downstream end surface of the second side wall portion.

9. The gas turbine according to claim 8,
wherein a distance in the circumferential direction between the first connection point and the second connection point is smaller than a distance in the circumferential direction between the inner wall surface of the first side wall portion and the inner wall surface of the second side wall portion.

10. The gas turbine according to claim 8,
wherein the first connection point of the first flat surface is positioned between the second side wall portion and the inner wall surface of the first side wall portion in the circumferential direction.

11. The gas turbine according to claim 8,
wherein the second connection point of the second flat surface is positioned between the first side wall portion and the inner wall surface of the second side wall portion in the circumferential direction.

12. The gas turbine according to claim 1,
wherein an angle formed by the first tangent line in the front part of the one of the first-stage stator vanes with respect to the axial direction is not less than 15 degrees and not greater than 45 degrees.

13. The gas turbine according to claim 2,
wherein an angle formed by the second tangent line in the front part of the one of the first-stage stator vanes with respect to the axial direction is not less than 0 degrees and not greater than 30 degrees.

14. The gas turbine according to claim 1,
wherein a minimum gap $g_1$ in the axial direction between the front part and the first side wall portion, and a minimum gap $g_2$ in the axial direction between the front part and the second side wall portion satisfy $0.9 \leq g_1/g_2 \leq 1.1$.

15. The gas turbine according to claim 1,
wherein the one of the first-stage stator vanes satisfies $0.1 \leq \Delta y/P \leq 0.2$.

* * * * *